US011790236B2

(12) United States Patent
Shamir

(10) Patent No.: US 11,790,236 B2
(45) Date of Patent: Oct. 17, 2023

(54) MINIMUM DEEP LEARNING WITH GATING MULTIPLIER

(71) Applicant: Google LLC, Mountain View, CA (US)

(72) Inventor: Gil Shamir, Sewickley, PA (US)

(73) Assignee: GOOGLE LLC, Mountain View, CA (US)

( * ) Notice: Subject to any disclaimer, the term of this patent is extended or adjusted under 35 U.S.C. 154(b) by 682 days.

(21) Appl. No.: 16/809,096

(22) Filed: Mar. 4, 2020

(65) Prior Publication Data

US 2021/0279591 A1 Sep. 9, 2021

(51) Int. Cl.
*G06N 3/084* (2023.01)
*G06N 3/04* (2023.01)

(52) U.S. Cl.
CPC .............. *G06N 3/084* (2013.01); *G06N 3/04* (2013.01)

(58) Field of Classification Search
CPC ........ G06N 3/084; G06N 3/04; G06N 3/0481; G06N 3/0445
See application file for complete search history.

(56) References Cited

U.S. PATENT DOCUMENTS

| | | | | |
|---|---|---|---|---|
| 10,305,766 B1 * | 5/2019 | Zhang | ...................... | G06N 3/044 |
| 2017/0316308 A1 * | 11/2017 | Srivastava | ............. | G06N 3/048 |
| 2019/0138887 A1 * | 5/2019 | Salem | ................... | G06N 3/048 |
| 2021/0279591 A1 * | 9/2021 | Shamir | .................. | G06N 3/048 |

FOREIGN PATENT DOCUMENTS

CN 108446978 A * 8/2018 ......... G06F 16/2465

OTHER PUBLICATIONS

R. Dey and F. M. Salem, "Gate-variants of Gated Recurrent Unit (GRU) neural networks," 2017 IEEE 60th International Midwest Symposium on Circuits and Systems (MWSCAS), Boston, MA, USA, 2017, pp. 1597-1600, doi: 10.1109/MWSCAS.2017.8053243. (Year: 2017).*
Heory of Gating in Recurrent Neural Networks Kamesh Krishnamurthy, Tankut Can, and David J. Schwab Phys. Rev. X 12, 011011—Published Jan. 18, 2022 (Year: 2022).*

(Continued)

*Primary Examiner* — Charles T Shedrick
(74) *Attorney, Agent, or Firm* — Dority & Manning, P.A.

(57) ABSTRACT

Systems and methods according to the present disclosure can employ a computer-implemented method for inference using a machine-learned model. The method can be implemented by a computing system having one or more computing devices. The method can include obtaining data descriptive of a neural network including one or more network units and one or more gating paths, wherein each of the gating path(s) includes one or more gating units. The method can include obtaining data descriptive of one or more input features. The method can include determining one or more network unit outputs from the network unit(s) based at least in part on the input feature(s). The method can include determining one or more gating values from the gating path(s). The method can include determining one or more gated network unit outputs based at least in part on a combination of the network unit output(s) and the gating value(s).

17 Claims, 12 Drawing Sheets

(56) References Cited

OTHER PUBLICATIONS

H. Jin, K. Yun and E. Kim, "Gating Mechanism in Deep Neural Networks for Resource-Efficient Continual Learning," in IEEE Access, vol. 10, pp. 18776-18786, 2022, doi: 10.1109/ACCESS. 2022.3147237. (Year: 2022).*
Learning in Gated Neural Networks, Ashok Vardhan Makkuva, Sewoong Oh, Sreeram Kannan, Pramod Viswanath (Year: 2020).*
On the Properties of Neural Machine Translation: Encoder-Decoder Approaches, Kyunghyun Cho Bart van Merrienboer (Year: 2014).*
Minimal Gated Unit for Recurrent Neural Networks (Year: 2026).*

* cited by examiner

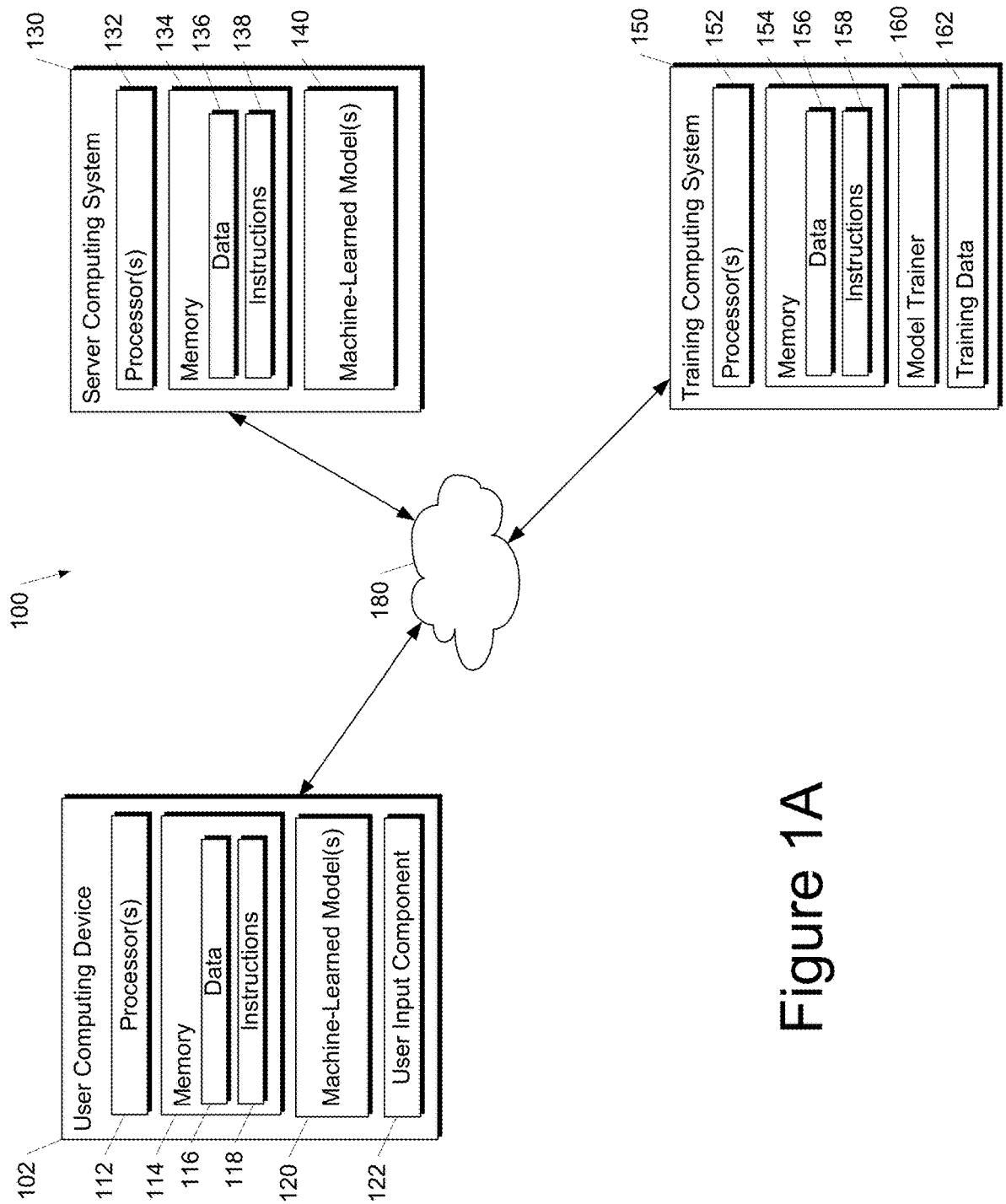

MINIMUM DEEP LEARNING WITH GATING MULTIPLIER

FIELD

The present disclosure relates generally to neural networks, such as machine-learned neural networks. In particular, the present disclosure relates to neural networks having a gating multiplier configured to weight contributions of a network unit of the neural network based at least in part on a benefit score associated with the network unit. The benefit score can, for instance, generally correlate to impact of the network unit on the neural network. For instance, the benefit score can correlate to impact of the network unit on the neural network with respect to a set of training data.

BACKGROUND

Artificial neural networks (also referred to simply as "neural networks") are a class of machine-learned models that are especially powerful, accurate, or otherwise high-performing for various tasks. An artificial neural network can include a group of connected nodes, which can also be referred to as (artificial) neurons or perceptrons. An artificial neural network can be organized into one or more layers. Artificial neural networks that include multiple layers can be referred to as "deep" networks.

Example artificial neural networks include feed-forward neural networks, recurrent neural networks, convolutional neural networks, other forms of artificial neural networks, or combinations thereof. Each of these example types has different internal structures or "architectures" that enable, in part, the particular benefits provided by that type of artificial neural network. For example, the architecture of an artificial neural network can correspond to or include the structure, arrangement, number, types, behavior, operations performed by, and/or other properties of the neurons or layers of neurons included in the network.

SUMMARY

One example aspect of the present disclosure is directed to a computing system that includes one or more processors and one or more non-transitory computer-readable media configured to store a neural network. In some implementations, the neural network can include a gated network unit comprising one or more network parameters. In some implementations, the neural network can include a gating path associated with the gated network unit. In some implementations, the gating path can include one or more gating units. In some implementations, each of the one or more gating units can include one or more gating parameters. In some implementations, the gating path can be configured to produce a gating value. A gated output of the gated network unit can be an intermediate output of the gated network unit multiplied by the gating value. In some implementations, the computing system can include instructions that, when executed by the one or more processors, cause the computing system to perform operations to train the neural network based on one or more training examples. In some implementations, the operations can include, for each of the one or more training examples, determining a gradient of a loss function with respect to at least one of the one or more network parameters and one or more gating parameters and updating a respective value of at least one of the one or more network parameters and the one or more gating parameters based on the gradient of the loss function.

Another example aspect of the present disclosure is directed to a computer-implemented method for performing inference using a machine-learned model. In some implementations, the computer implemented method can include obtaining, by a computing system comprising one or more computing devices, data descriptive of a neural network having one or more network units and one or more gating paths, each of the one or more gating paths associated with each of the one or more network units, wherein each of the one or more gating paths includes one or more gating units. In some implementations, the computer implemented method can include obtaining, by the computing system, data descriptive of one or more input features. In some implementations, the computer implemented method can include determining, by the computing system, one or more network unit outputs from the one or more network units based at least in part on the one or more input features. In some implementations, the computer implemented method can include determining, by the computing system, one or more gating values from the one or more gating paths. In some implementations, the computer implemented method can include determining one or more gated network unit outputs based at least in part on a combination of the one or more network unit outputs and the one or more gating values.

Another example aspect of the present disclosure is directed to a computer-implemented method of deploying a machine-learned model. In some implementations, the computer implemented method can include obtaining, by one or more computing devices, data descriptive of a neural network including one or more network units and one or more gating units, the one or more gating units included in one or more gating paths associated with the one or more network units. In some implementations, the computer implemented method can include training, by the one or more computing devices, the neural network to learn one or more network parameters of the one or more network units and one or more gating parameters of the one or more gating units. In some implementations, the computer implemented method can include sparsifying, by the one or more computing devices, the neural network based at least in part on the one or more gating parameters of the one or more gating units to generate a sparsified neural network. In some implementations, the computer implemented method can include deploying the sparsified neural network to perform inference.

BRIEF DESCRIPTION OF THE DRAWINGS

Detailed discussion of embodiments directed to one of ordinary skill in the art is set forth in the specification, which makes reference to the appended figures, in which:

FIG. 1A depicts a block diagram of an example computing system that implements one or more neural networks according to example aspects of the present disclosure;

Figure 1B:
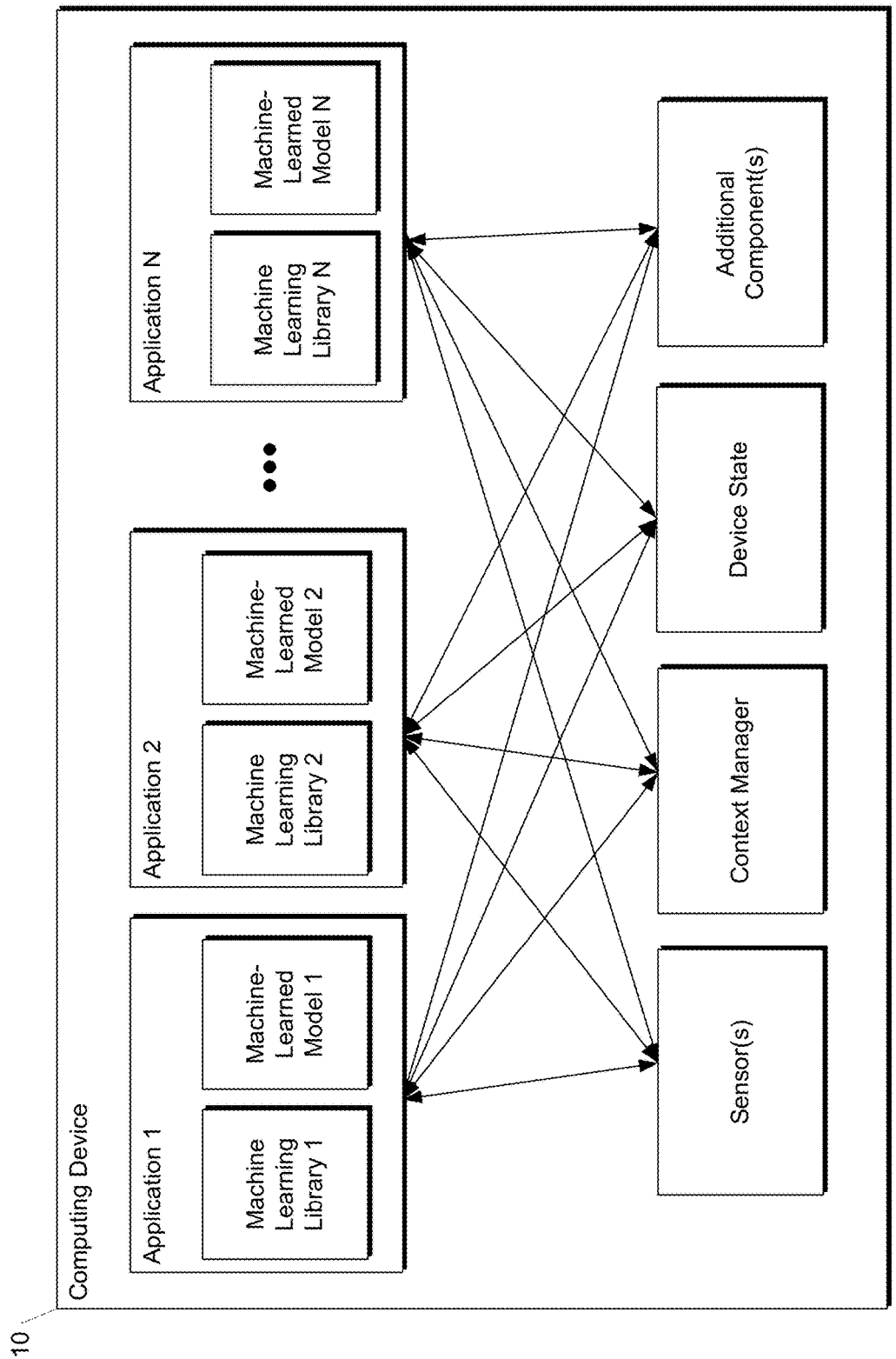
FIG. 1B depicts a block diagram of an example computing device that implements one or more neural networks according to example aspects of the present disclosure.

Reference numerals that are repeated across plural figures are intended to identify the same features in various implementations.

DETAILED DESCRIPTION

Overview

Generally, the present disclosure is directed to systems and methods for inference using neural networks. In particular, the present disclosure describes neural networks (e.g., deep neural networks) that include one or more network units and one or more learned gating multipliers, also referred to herein as gating units. The one or more gating units can be associated with one or more network units and configured to scale and/or eliminate contributions (e.g., outputs) from the one or more network units. For instance, the one or more gating units can scale the contributions from the one or more network units based generally on how beneficial to the overall model the one or more network units and/or contributions are.

According to example aspects of the present disclosure, a neural network can include one or more network units. For instance, network units can include, but are not limited to, input features, input nodes, embedding units, embedding vectors (e.g., representing input features, such as a specific input feature and/or feature value), links (e.g., hidden layer links), weights (e.g., link weights), biases (e.g., hidden layer biases), neuron units (e.g., hidden neurons), activation values for neurons (e.g., hidden neurons), including activation values for a specific input (e.g., training example), matrix multiplication parameters, or any other suitable component of a neural network.

In some embodiments, a network unit can include at least one end unit. An end unit can be a unit that represents the end of backpropagation along a path. In other words, an end unit is a unit from which a gradient is not backpropagated further during backpropagation training. For instance, an end unit can include, but may not be limited to, embeddings, input features, bias nodes (e.g., hidden layer biases), and/or link weights (e.g., hidden layer link weights, such as multiplication matrix parameters). In some cases, a network unit can include at least one hidden unit. A hidden unit can be a unit that is included in a hidden layer.

According to example aspects of the present disclosure, a neural network can include one or more gating units associated with some or all of one or more network units. The one or more gating units can provide a gating value for an associated network unit. For instance, the output of the associated network unit can be multiplied with the gating value to produce a gated output. The gated output can be substituted for the output from the network unit. For instance, the gated output can be propagated (e.g., forward propagated) in the neural network in place of the output. In this manner, the gated output can essentially be the output from the network unit that is scaled by the gating path. As used herein, a gating path associated with a network unit can include any of the one or more gating units configured to ultimately provide a gating value for the network unit. For instance, a gating path can include all of the one or more gating units used in providing the gating value for the network unit, and/or exclude any of the one or more gating units not used, directly or otherwise, in providing the gating value for the network unit.

In some embodiments, the one or more gating units can be and/or include stateful gating units. For instance, one or more stateful gating units can be associated with, depend on, or otherwise relate to a state of the neural network, such as an input state. Additionally and/or alternatively, one or more gating units can be and/or include stateless gating units. For instance, the one or more stateless gating units can be independent of a state of the neural network. As another example, a stateless gating path comprising one or more stateless gating units can be used for stateless network units such as, for example, input features and/or biases. As another example, a stateful gating path can be used for a stateless network unit, such as, for example, an end unit, such that the gating path operates based at least in part on a state of the neural network, even if the stateless network unit does not affect the state of the network.

In some embodiments, different configurations of gating paths can be used for different network units in a particular neural network. For example, one or more first network units (e.g., a layer, such as an input layer) can employ a first configuration for a first gating path, and one or more second network units (e.g., a layer, such as a hidden layer) can employ a second configuration for a second gating path, even if the first network units and second network units are included in the same neural network.

According to example aspects of the present disclosure, the one or more gating units can include one or more benefit paths including one or more benefit units. The one or more benefit units can be components of a neural network, such as, but not limited to, nodes, links, biases, or any other suitable components. The one or more benefit paths and/or the one or more benefit units can include one or more benefit path parameters. For instance, the one or more benefit path parameters can include link weights, bias values, embeddings (e.g., embedding vectors), or any other suitable parameters.

A benefit path can be configured to compute one or more benefit scores. The one or more benefit scores can be provided as input(s) to the one or more scaling functions. Informally, the one or more benefit scores can be learned to generally correlate to relative usefulness or benefit of the associated network units to the neural network. For instance, the one or more benefit scores can represent an effect (e.g., a magnitude and/or a significance of effect) that the associated network unit(s) has on predictions from the neural network, such as the overall prediction and/or localized outputs from the associated network unit(s) and/or network units proximate the associated network unit(s). For example, a network unit that is detrimental to the overall performance of the neural network or has a relatively low effect on the overall performance will likely have a low benefit score learned for the network unit, such as a benefit score with a value of about zero.

In some embodiments, a benefit path can include a coupled benefit unit configured to store a benefit score (e.g., a learned benefit score) for an associated network unit. For instance, the benefit score can be learned during training and stored in the benefit unit. In other words, the value of the coupled benefit unit may be the only benefit path parameter (e.g., a bias value) for the benefit path. In some embodiments, this configuration can be utilized for benefit paths corresponding to end units, such as input features or embeddings, biases, or link weights.

In some embodiments, a benefit path for an associated network unit can be based at least in part on one or more network units. For example, a benefit path can include a weighted sum of one or more network unit values (e.g., outputs and/or parameters) from one or more network units. In some embodiments, the weighted sum of outputs can include outputs that are gated (e.g., by other gating units for other network units). In some embodiments, the weighted sum of outputs can include outputs that are not gated (e.g., outputs that are not multiplied by a gating value). In some embodiments, a benefit path for an associated network unit can include a weighted sum of network unit values from some or all of the one or more network units on a same layer as the associated network unit, including or excluding the associated network unit. In some embodiments, a benefit path for an associated network unit on a first layer can include a weighted sum of network unit values from some or all of the one or more network units on a second layer. For instance, the second layer can be a prior layer to the first layer, such as a layer directly preceding the first layer. For instance, a prior layer and/or directly preceding layer can produce outputs that are forward propagated as inputs to the first layer.

In some embodiments, the weighted sum of network unit values can be computed by a benefit matrix. For example, the benefit matrix can include at least one benefit unit defining a multiplier, each multiplier associated with one of the some or all network units in a layer (e.g., the same layer or the second layer). In some embodiments, the benefit matrix can be one-dimensional (e.g., a benefit vector) such that the benefit score for the associated network unit is defined as the sum of the component-wise vector product of the benefit matrix and the one or more network unit values.

In some embodiments, the benefit matrix can be a two-dimensional matrix, such as a square matrix. For instance, the benefit matrix can define a benefit vector for each of the network units in a layer. In this way, the product of a layer of network unit values and the benefit matrix can produce a benefit layer corresponding to the layer of network units. The benefit score for each network unit in the layer can thus be computed simultaneously. In some cases, computing the benefit score for each network unit in the layer simultaneously can serve to expedite processing and/or conserve computing resources. Additionally, in some cases, the vector product can be performed efficiently on hardware that is typically utilized for neural network processing. For instance, typical hardware for neural network processing can often efficiently perform vector processing. In other words, the hardware can be best suited to perform similar or same operations on a plurality of independent and/or correlated inputs, such as components of a vector. Thus, by providing a benefit layer, benefit scores for a plurality of network units can more easily be computed simultaneously, such as by being computed as a vector operation.

Embodiments where the benefit path includes a weighted sum of network unit values on a prior second layer and the weighted sum is computed by a two-dimensional benefit matrix can be particularly beneficial for parallel implementations. For instance, in some cases, the computation can be broken into two steps, which can be performed in parallel. For example, in some cases, values from one or more layers of the benefit path and layers of the network can be computed simultaneously, as the computation of benefit path values and computation of network unit values are independent at a particular stage (e.g., per layer). Additionally and/or alternatively, typical hardware for neural network processing can be configured for parallel computations. By parallelizing the operations, the hardware can thus be utilized more efficiently.

In some embodiments, a benefit path can include one or more layers, each layer including one or more benefit units. For example, in some embodiments, the benefit path can be a deep benefit path that includes a plurality of layers. In some embodiments, the one or more layers can include one or more bottleneck layers. The one or more bottleneck layers can have a lower dimensionality (e.g., include fewer nodes) than preceding layers in the benefit path and/or a lower dimensionality than a corresponding network unit layer. For instance, in some embodiments, the benefit path can narrow in dimensionality at one or more bottleneck layers. In some embodiments, the benefit path can then increase in dimensionality over one or more layers. For instance, the benefit path can increase in dimensionality over one or more layers to return to the dimension of a corresponding network unit layer, such as, for example, before the benefit path produces one or more benefit scores. Bottleneck layers can assist in reducing memory usage and/or computing resources required to deploy and/or evaluate the neural network without significantly compromising performance. For instance, bottleneck layers can require fewer parameters that must be stored in memory and/or require fewer computations to evaluate than a higher-dimensionality layer, such as a layer at the same dimension of a corresponding network unit layer.

In some embodiments, a feature (e.g., an input feature) can be represented by an embedding vector having one or more embedding components (e.g., real numbers). In some embodiments, a benefit score can be computed individually for each embedding component. Additionally and/or alternatively, a single benefit score can be computed and stored for a feature and applied to each embedding component for the feature.

In some embodiments, a benefit score can be approximated from learned weights and feature (e.g., training example and/or inference input) count statistics. This can save on computing resources, as it is not necessary to save the benefit score.

In some embodiments, the one or more gating units can include one or more scaling functions associated with some or all of the one or more network units. In some embodiments, each of the one or more scaling functions is associated with exactly one of the one or more network units. A scaling function can be configured to scale a benefit score (e.g., from a corresponding benefit path) to produce a gating value for an associated network unit. In some embodiments, the gating value produced by the scaling function can be multiplied directly with a contribution from the associated network unit. In some embodiments, the gating value produced by the scaling function can be clipped (e.g., clipped below a threshold) before being multiplied with the contribution from the associated network unit. In some embodiments, the gating value produced by the scaling function can be clipped in forward propagation (e.g., inference) and not clipped in backpropagation (e.g., training).

A scaling function can be any suitable function defined with one or more parameters (e.g., multiplicands, biases, divisors, limits, slopes, scaling, etc.). The one or more scaling functions can vary between layers and/or different types of associated network unit. For instance, parameter values and/or functional form (e.g., type of function used) can vary across the one or more scaling functions. In some embodiments, the same parameter values and/or functional form may be used for scaling functions in the same layer and/or with the same type of associated network unit. In some embodiments, the one or more parameters and/or the functional form of the one or more scaling functions can be learned during training of the neural network. For instance, in some embodiments, the functional form of the one or more scaling functions can be selected from a set of possible functional forms. In some embodiments, the one or more scaling functions can have a functional form having finite range, such as a range of $[0, 1]$, or a clipped range, such as $[0, \infty]$.

In some embodiments, a scaling function can be a sigmoid function, such as sigmoid($\rho*b+\xi$), where $\rho$ is a ramp-up coefficient which represents effects of correlation of one or more network units within a layer and $\xi$ is a mix-in margin which represents a contribution to importance from a prior, where b is a benefit score, defined as the input to the scaling function. The sigmoid function described above essentially mixes the network unit with a zero unit, producing a value approaching zero for network units with low benefit relative to other network units.

In some embodiments, a scaling function can be utilized additionally and/or alternatively to an activation function. For instance, the scaling function can additionally be a function of the output of the network unit and can "activate" (e.g., produce a significant output, such as a non-zero output) if the value of its input(s) is above a certain threshold. For example, the scaling function can include at least one full stop region, wherein the output of the scaling function is zero for inputs having values within the at least one full stop region.

In some embodiments, the one or more gating units can include one or more clipping functions. The one or more clipping functions can produce a clipped gating value. The one or more clipping functions can clip contributions from non-beneficial network units. In some embodiments, the one or more clipping functions can clip contributions based at least in part on a clipping threshold. For instance, the one or more clipping functions can clip values that are below the clipping threshold to an exact zero. If the value is above the clipping threshold, the clipping function may pass the value through, or pass a multiple of the value, or pass some other nonzero number. In some embodiments, the clipping threshold can be zero. In some embodiments, the clipping threshold can be between zero and one, such as between zero and 0.1.

In some embodiments, the clipping threshold can be selected based on an initial value for benefit scores. For example, the clipping threshold can be selected such that the clipping threshold does not clip potentially beneficial network units before they have been trained, especially in cases where the clipped gating value is used in backpropagation. Additionally and/or alternatively, the clipping function can be an activation function, such as a ReLU activation function. In some embodiments, the clipped gating value can be used during forward propagation (e.g., during inference) and the gating value (i.e., the input to the clipping function) can be used during backpropagation. This can prevent a network unit from being locked into a zero clipped gating value indefinitely. Additionally and/or alternatively, in some embodiments, clipping is not performed (i.e., in either forward propagation and/or backpropagation steps) while training the machine-learned model. For instance, a clipping function can be utilized only during forward propagation at inference time.

Additionally and/or alternatively, clipping the gating value can be achieved by the functional form of a scaling function. Such scaling functions can be referred to as "self-clipping scaling functions." For instance, if a scaling function is an activation function with a full stop region, such as ReLU, the scaling function can be a self-clipping scaling function that scales and clips a benefit score. Other scaling functions with a stop region can be utilized if a nonlinear relationship is desired between the benefit score and gating value, such as a scaled half-sigmoid or shifted smooth continuous piecewise activation functions. In some cases, self-clipping scaling functions can improve performance of the neural network, as they can reduce memory usage of the network by requiring parameters for the self-clipping scaling function to be stored in place of separate parameters for a clipping function and a scaling function, which can often decrease the amount of parameters that are stored.

In some embodiments, the one or more gating units can include one or more gating parameters. For example, the one or more gating parameters can include benefit path parameters, such as biases (e.g., stored benefit scores), link weights, or benefit matrix values. As another example, the one or more gating parameters can include scaling function parameters, such as mix-in margins, functional forms, ramp-up coefficients, or other suitable scaling function parameters. As another example, the one or more gating parameters can include clipping function parameters, such as clipping thresholds, functional forms, slopes, or other suitable clipping function parameters.

In some embodiments, the one or more gating parameters can be learned during training of the neural network. For instance, the gating parameters can be learned during backpropagation with stochastic gradient descent (e.g., per coordinate SGD, such as AdaGrad). In some embodiments, the gating units can be trained using the same learning algorithm used to train the network units. In some embodiments, a learning rate can be tuned for the gating units. For example, in cases where a gating unit is responsible for more than one network unit, it may be desirable to have a lower learning rate for the gating unit, as the gating unit may receive more gradient updates per training example than a single network unit.

In some embodiments, the one or more gating parameters can be learned by online training. For instance, during online training, the neural network is trained over time and the benefit accrued by a feature per training example encapsulates improvement to an objective with the feature and a cost of learning the feature using a learning algorithm. In some embodiments, the one or more gating parameters can be learned by online training, and in subsequent visits to an epoch, updates to the one or more gating parameters can be scaled down.

In some embodiments, the one or more gating parameters can be learned by training over a plurality of epochs. In cases where each training example is visited over a plurality of epochs, the gain on a training objective per feature can be linear with the number of relevant training examples, but the cost per feature may be sublinear. In these cases, it can be desirable to scale the benefit over iterations of the same training example to avoid overvaluing the benefit contribution. For example, in some embodiments, a gating parameter can be updated only for the first iteration of a training example. As another example, the amount that a gating parameter is changed can be scaled (e.g., scaled down) in subsequent visits to the same training example. For instance, the amount can be scaled to the same level for all subsequent visits and/or scaled as a function of the number of times the same training example is visited. As another example, a gating parameter can be reset between visits and updated for each epoch that visits all training examples. In some embodiments, a gating parameter from a prior epoch can be used to scale the feature during a current epoch.

As another example, the one or more gating parameters can be learned by a convex combination score that scales down an initial (e.g., during the first epoch) gating parameter and scales up a gating parameter from newer epochs. For instance, the gating parameter can be learned by subtracting sublinear terms representing a lower bound (e.g., 0.5 log n) on the learning cost for the parameter. At late epochs, the gating parameter will then be the improvement on the loss with a negative additional term of 0.5 log n. In this example, n is the number of training examples seen with a feature.

In some embodiments, the one or more gating parameters can be learned for and/or associated with a particular activation value. For instance, an activation value can represent a localized and/or overall state of the neural network, such as a particular input feature value, embedding value, cross of features, intermediate value, such as an intermediate value at a set of network units of the neural network, activation status at a set of neurons, or any other suitable state of the neural network. For instance, in one embodiment, a neuron (e.g., a hidden layer neuron) can act as a first combination of features for a first input example (e.g., one or more features and/or embeddings), and as a second combination of features for a second input example (e.g., one or more features and/or embeddings). A gating parameter can be determined for a specific cross of features represented by the unique activation value for which the cross is triggered. A learned path can invoke the gating parameter for the cross of features. Additionally and/or alternatively, the one or more gating parameters can be aggregated at a network unit across all activation values.

In some embodiments, a gating parameter can be initialized to a mix-in margin (i.e., the parameter $\xi$ of a sigmoid activation function). For example, embodiments wherein a benefit includes a single coupled benefit unit may initialize the value of the benefit unit to the mix-in margin. As another example, embodiments wherein a benefit path includes a weighted sum of values can include one or more biases that can be initialized to the mix-in margin.

In some embodiments, a gating parameter can be initialized to zero. In some embodiments, for example wherein a benefit path includes a single coupled benefit unit, this can result in the benefit score remaining at zero until a training process includes an example that suggests the benefit of a network unit. In some embodiments, the benefit path can be initialized to zero by initializing a top matrix of the benefit path to zero. In some cases, for example cases with a deep benefit path and/or deep benefit path with a bottleneck layer, it can be desirable to initialize only one matrix in the deep benefit path to zero. This can ensure initial convergence of the benefit score.

In one example backpropagation training process, if a network unit is desirably contributing to an objective (e.g., by reducing the loss on a current training example), then the training process can increase a magnitude of at least one of the one or more network parameters. Additionally and/or alternatively, the training process can update a value of at least one of the one or more gating parameters to increase a benefit score for the network unit. If the network unit is detrimental to the objective, the training process can decrease the magnitude of at least one of the one or more network parameters towards zero. Additionally and/or alternatively, the training process can update a value of at least one of the one or more gating parameters to decrease the benefit score for the network unit. In this way, the one or more gating units can shield the network from detrimental network units, which can prevent degradation of the objective from the detrimental network units.

In some embodiments, a neural network can be trained in its entirety and sparsified such that a sparsified neural network is created for deployment. For instance, in some embodiments, a benefit path can be simplified after benefit path parameters have been learned through training. For example, any multiplication and function evaluation (e.g., scaling and/or clipping function evaluation) can be performed based on any known values of benefit score (e.g., from a bias unit) and replaced by a bias unit to be multiplied with a network unit output. In some cases, such as in the case where a network unit includes a linear link having a link weight, the link weight can be scaled by the known gating value or clipped gating value before deployment.

Additionally and/or alternatively, some network units which are clipped to zero, such as, for example, sparse embeddings, complete layers of a multiplication matrix, biases (e.g., biases connected to neurons), can be removed entirely from the sparsified network. For instance, in some cases, network units (e.g., end units and/or neurons, such as stateless neurons) with gating values less than the clipping threshold can be removed from the deployed model. For instance, if an embedding vector is clipped to zero, it can be removed from an embedding table. If a hidden network unit is clipped to zero, it can be discarded from a multiplication matrix. For instance, in some cases, only if a hidden network unit is clipped to zero across all activation values can a respective row and/or bias can be discarded from a multiplication matrix. As another example, some percentage of network units with the lowest benefit score can be removed from the sparsified model.

Systems and methods according to example aspects of the present disclosure can provide for a number of technical effects and benefits. For instance, example aspects of the present disclosure can reduce overfitting in a neural network. Overfitting (e.g., from overparameterization) affects prediction performance of mathematical models including complex models such as deep neural networks. For instance, a deep model (e.g., a deep neural network) can be trained over training examples to learn trends in the training examples. Many of these trends can be desirable to learn. However, some trends can instead include contributions from noise or other undesirable factors. The model can thus be unable to distinguish between noise (e.g., uncertainty) and features. In other words, inferences or predictions from the model can be determined using parameters or other features that are largely due to noise or a smaller-than-necessary amount of training examples used to train the parameters or other features. Reducing the effect of features (or noise) with greater uncertainty than benefit and/or that do not affect predictions can thus improve performance of the models. This can especially be true in models that observe little training data, have some very limited populations of some unique examples that are different from others (e.g., the majority), and/or are online systems with statistically changing behavior of the data.

Systems and methods according to example aspects of the present disclosure can also have improved reproducibility. For instance, two identical neural networks trained on the same corpus of training data can have variability due to randomness in training, training optimizers, order of training examples, and other factors. Due to the effective non-convexity of the objective, the two networks can converge to different solutions. These solutions can also be affected by overfitting by using parameters that are noise or uncertainty as part of the prediction, which can compound the differences. Thus, reducing non-beneficial parameters according to example aspects of the present disclosure can serve to improve reproducibility by reducing the contribution from noisy or uncertain components.

Systems and methods according to example aspects of the present disclosure can also experience an improvement in computing resource savings. For instance, it may be desirable to train a model in its entirety and deploy a sparsified model that resembles the model but requires fewer processing resources to evaluate, is smaller in memory, and/or meets some requirement with respect to computing resources. Typically, a tradeoff is associated with sparsity versus accuracy with respect to the original model. According to example aspects of the present disclosure, models can be sparsified by removing less beneficial components first, such that the overall performance of the sparsified model is preserved as the model is sparsified. In other words, the loss in performance with respect to a removed network unit can be decreased, as the least helpful (and/or most detrimental) network units are removed first. As another example, the model can be sparsified according to a targeted deterministic dropout method, where the least beneficial units (e.g., a set quantity or quota of units and/or all units below a benefit threshold) are dropped out. For instance, a quota of the quantity of units for sparsifying can be determined based on a desired amount of computing resources to be used at inference time. Thus, the sparsified model can see a significant decrease in deployment size with only a marginal impact to performance, if any.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

For instance, neural networks according to example aspects of the present disclosure can be configured to receive any kind of digital data input and to generate any kind of prediction (e.g., score or classification) output based on the input. The training examples may therefore take various forms. For example, the training examples may be images or features that have been extracted from images, and the neural network may be trained to output for a given image scores for each of a set of object categories, with each score representing an estimated likelihood that the image contains an image of an object belonging to the category. As another example, if the training examples may be Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic. As another example, the training examples may be text in one language and the output generated by the neural network may be a score for each of a set of pieces of text in another language, with each score representing an estimated likelihood that the piece of text in the other language is a proper translation of the input text into the other language.

As another example, the training examples may be spoken utterances, a sequence of spoken utterances, or features derived from one of the two, the output generated by the neural network may be a score for each of a set of pieces of text, each score representing an estimated likelihood that the piece of text is the correct transcript for the utterance or sequence of utterances. As another example, the neural network can be part of an auto-completion system or part of a text processing system. As another example, the neural network can be part of a reinforcement learning system and can generate outputs used for selecting actions to be performed by an agent interacting with an environment. For example, the neural network can generate outputs used for selecting actions to be performed by a robotic agent interacting with a real-world environment, or for selecting actions to be performed by a virtual agent interacting with a simulated environment.

The example neural network applications described above are not exhaustive, and other applications for the neural networks generated as described in this written description may also be used.

With reference now to the Figures, example embodiments of the present disclosure will be discussed in further detail.

Example Devices and Systems

FIG. 1A depicts a block diagram of an example computing system 100 that can employ neural networks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example neural network models 120 are discussed with reference to FIGS. 2 through 9.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel computation across multiple instances of a machine-learned model).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 through 9.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, sets of input data labeled with expected outputs. As another example, the training data 162 can include online training data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement neural networks according to the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that can implement neural networks according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
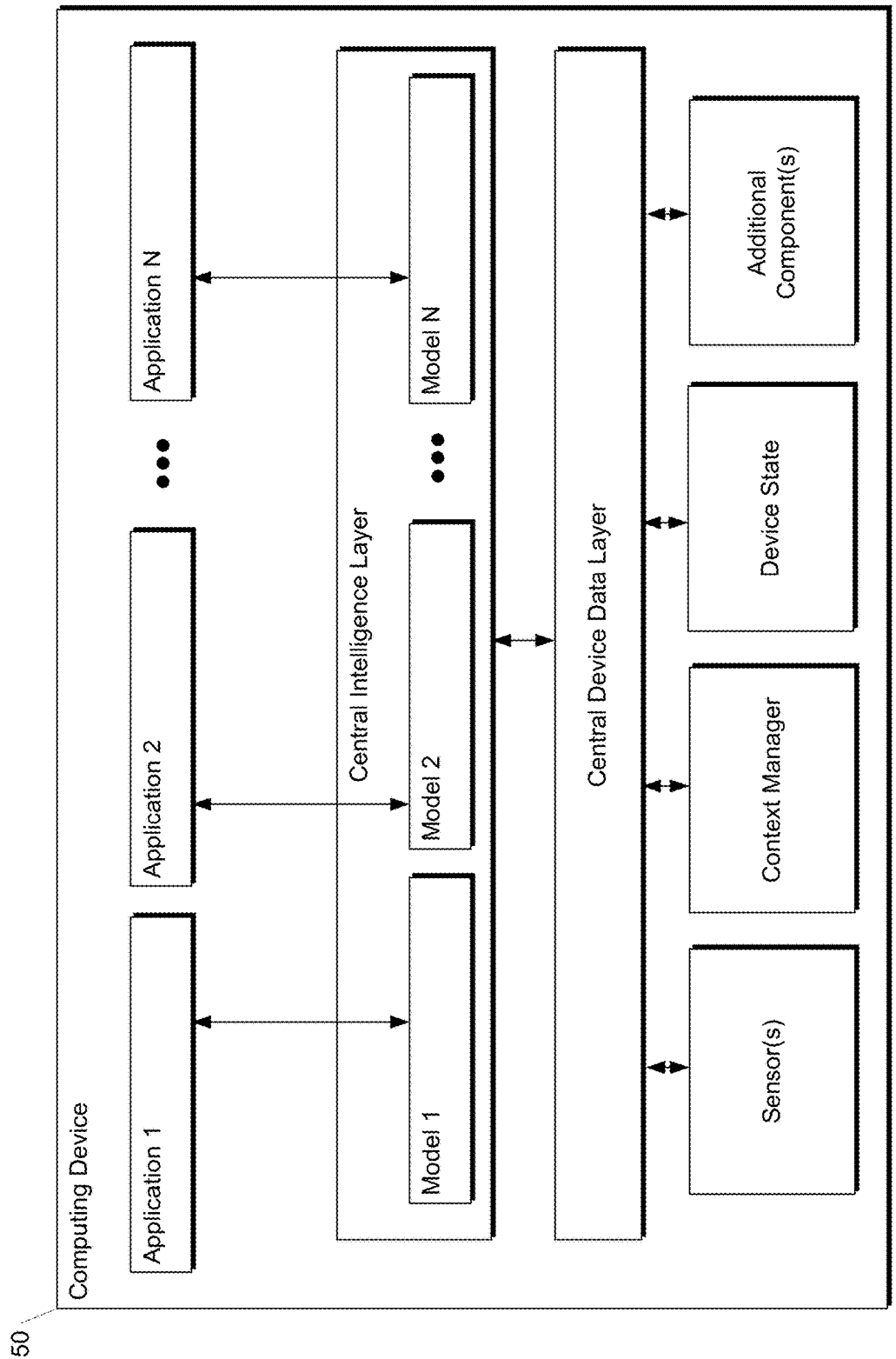
FIG. 1C depicts a block diagram of an example computing device that implements one or more neural networks according to example aspects of the present disclosure.

FIG. 1C depicts a block diagram of an example computing device 50 that can implement neural networks according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Gated Network Units

Figure 2:
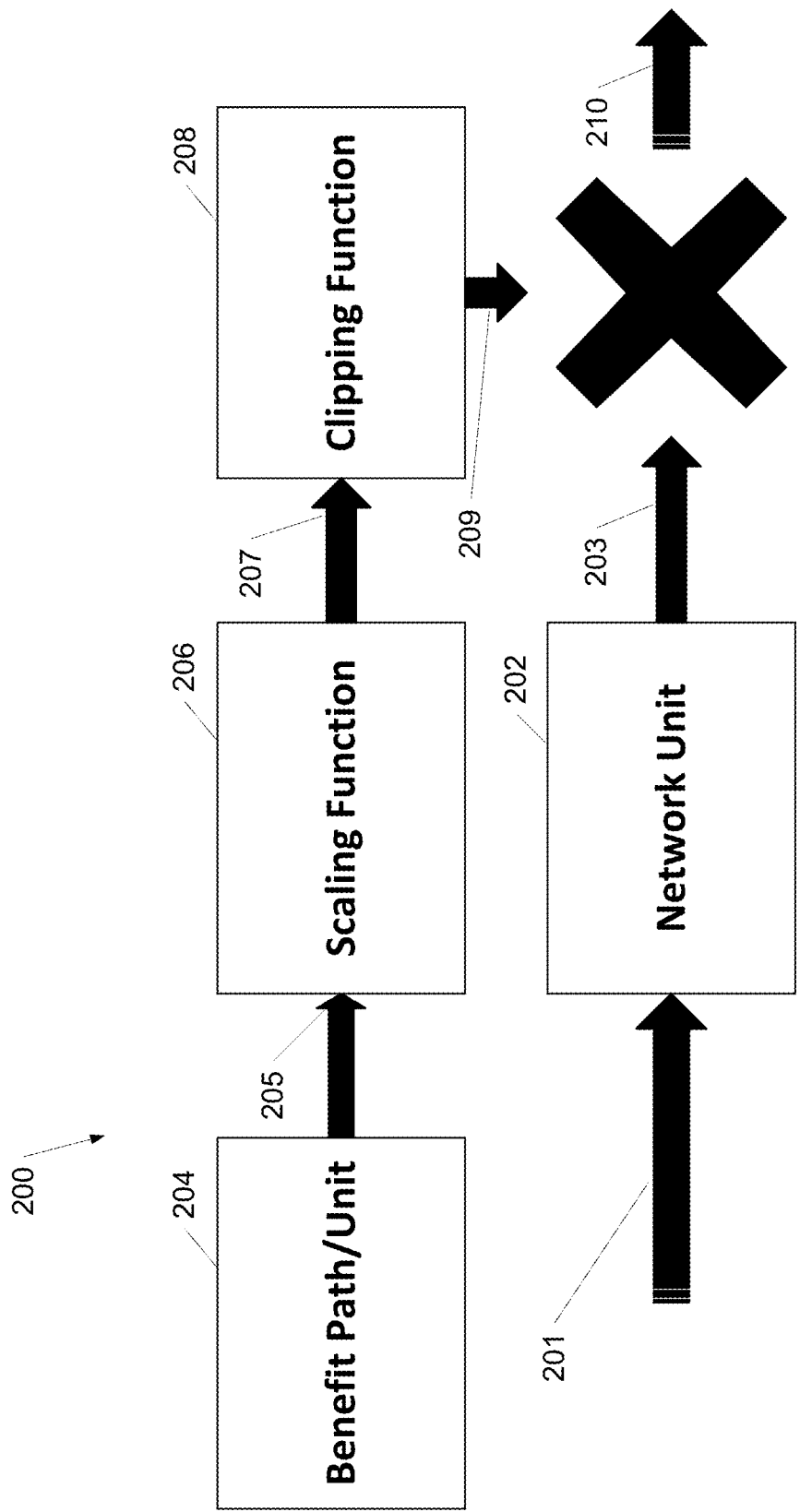
FIG. 2 depicts a block diagram of an example gated network unit according to example aspects of the present disclosure.
Figure 3:
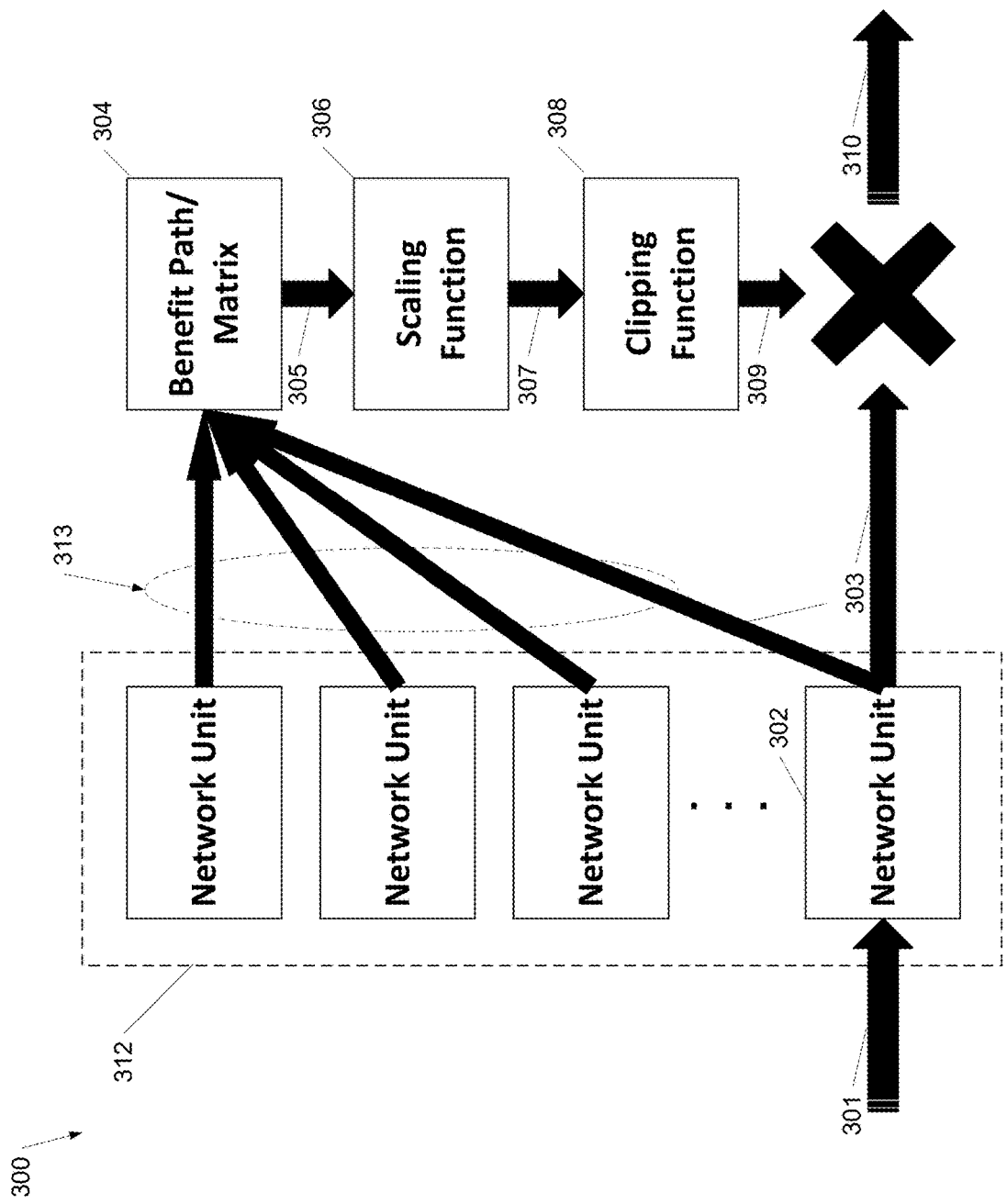
FIG. 3 depicts a block diagram of an example gated network unit according to example aspects of the present disclosure.
Figure 4:
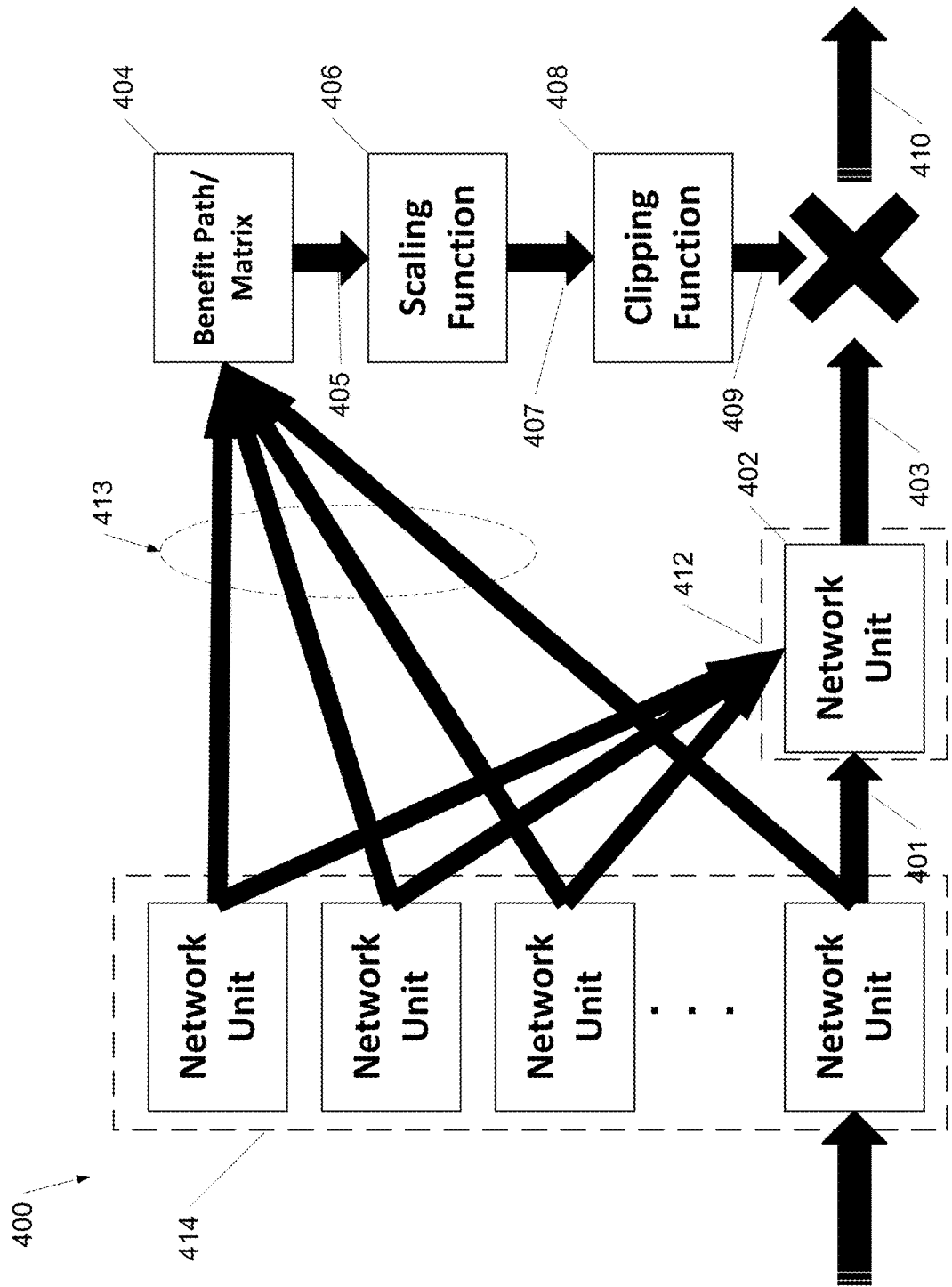
FIG. 4 depicts a block diagram of an example gated network unit according to example aspects of the present disclosure.

Referring now to FIGS. 2 through 4, example configurations of gated network units are discussed according to example aspects of the present disclosure. The example configurations discussed in FIGS. 2 through 4 are provided for the purpose of illustration. One of ordinary skill in the art will understand that modifications and variations may be made to the embodiments illustrated in the figures without departing from the scope and spirit of the present disclosure.

FIG. 2 depicts an example gated network unit 200 according to example aspects of the present disclosure. The gated network unit 200 includes a network unit 202. For instance, network unit 202 can be, but is not limited to, an input feature, input node, embedding unit, embedding vector (e.g., representing input features, such as a specific input feature and/or feature value), link (e.g., hidden layer links), weight (e.g., link weights), bias (e.g., hidden layer biases), neuron unit (e.g., hidden neurons), matrix multiplication parameter, or any other suitable component of a neural network. Arrows (e.g., input 201, gated output 210) can represent a scalar quantity and/or a vector quantity having any dimensionality. In some example neural networks, gated network unit 200 can be employed for network units that are and/or include end units. As another example, in some example neural networks, gated network unit 200 can be employed for network units that are and/or include linear network units, such as linear layers.

In response to input 201, network unit can be configured to provide network unit output 203. For instance, network unit output 203 can be the output from the network unit 202 without adjustment by gating units (e.g., benefit path 204, scaling function 206, clipping function 208). Network unit output 203 can be multiplied by gating value 209 or, in embodiments without clipping function 208, scaled benefit value 207 to produce gated output 210. Gated output 210 can be propagated further along the neural network (e.g., in place of network unit output 203).

The gated network unit 200 additionally includes benefit path 204. Benefit path 204 can include one or more benefit units configured to provide benefit score 205. Any suitable arrangement and/or number of benefit units can be employed in benefit path 204. For instance, benefit path 204 can include one or more benefit units that are learned by training a machine-learned model containing gated network unit 200.

Informally, the benefit score 205 can be learned to generally correlate to relative usefulness or benefit of network unit 202 to the neural network. For instance, the benefit score 205 can represent an effect (e.g., a magnitude and/or a significance of effect) that network unit 202 has on predictions from the neural network, such as the overall prediction and/or localized outputs (e.g., gated output 210) from the network unit 202 and/or other network units proximate network unit 202.

In the embodiment of gated network unit 200, benefit path 204 can be a benefit unit 204 configured to store and output benefit score 205 for network unit 202. For instance, the benefit score 205 can be learned during training and stored in the benefit path 204. In other words, the value of the benefit score 205 may be the only benefit path parameter for benefit path 204. In some embodiments, the configuration depicted in FIG. 2 can be utilized for benefit paths corresponding to end units, such as input features or embeddings, biases, or link weights.

The gated network unit 200 additionally includes scaling function 206. Scaling function 206 is configured to produce scaled benefit value 207 based on benefit score 205. Scaling function 206 can be any suitable function defined with one or more parameters (e.g., multiplicands, biases, divisors, limits, slopes, scaling, etc.). In some embodiments, the one or more parameters and/or the functional form of scaling function 206 can be learned during training of the neural network. For instance, in some embodiments, the functional form of the scaling function 206 can be selected from a set of possible functional forms. In some embodiments, the scaling function 206 can be a function with a finite range, such as a range of [0, 1], or a clipped range, such as [0, ∞].

In some embodiments, scaling function 206 can be a sigmoid function, such as sigmoid($\rho*b+\xi$), where $\rho$ is a ramp-up coefficient which represents effects of correlation of one or more network units (e.g., including network unit 202) within a layer and $\xi$ is a mix-in margin which represents a contribution to importance from a prior, where b is benefit score 205. The sigmoid function described above essentially mixes the network unit with a zero unit, producing a value approaching zero if network unit 202 has low benefit relative to other network units.

The gated network unit 200 additionally can include clipping function 208. In some embodiments, clipping function 208 may be omitted, and scaled benefit value 207 may be multiplied directly with network unit output 203 (e.g., in place of gating value 209). Clipping function 208 is configured to clip scaled benefit value 207. For instance, gating value 209 can be clipped (e.g., to zero) if scaled benefit value 207 is below some threshold, such as a clipping threshold. If scaled benefit value 207 is above the clipping threshold, the gating value 209 may be close to and/or equivalent to scaled benefit value 207, or a multiple of scaled benefit value 207, or any other nonzero number.

In some embodiments, the clipping threshold can be zero. In some embodiments, the clipping threshold can be between zero and one, such as between zero and 0.1. In some embodiments, the clipping threshold can be selected based on an initial value for benefit score 205. For example, the clipping threshold can be selected such that the clipping threshold does not clip potentially beneficial network unit 202, especially in cases where the gating value 209 is used in backpropagation (e.g., as opposed to scaled benefit value 207). Additionally and/or alternatively, the clipping function 208 can be an activation function, such as a ReLU activation function. In some embodiments, the gating value 209 can be used during forward propagation and the scaled benefit value 207 can be used during backpropagation. This can prevent network unit 202 from being locked into a zero gating value 209 indefinitely. In some embodiments, the scaled benefit value 207 can be used for training the network (e.g., in both forward propagation and backpropagation steps), and gating value 209 can be used for forward propagation at inference time.

FIG. 3 depicts an example gated network unit 300 according to example aspects of the present disclosure. The gated network unit 300 includes a network unit 302. For instance, network unit 302 can be, but is not limited to, an input feature, input node, embedding unit, embedding vector (e.g., representing input features, such as a specific input feature and/or feature value), link (e.g., hidden layer links), weight (e.g., link weights), bias (e.g., hidden layer biases), neuron unit (e.g., hidden neurons), matrix multiplication parameter, or any other suitable component of a neural network. Arrows (e.g., input 301, gated output 310) can represent a scalar quantity and/or a vector quantity having any dimensionality. Network unit 302 is included in layer 312. Layer 312 can include one or more network units other than network unit 302. For instance, layer 312 can be a layer of a neural network. In some example neural networks, gated network unit 300 can be employed for network units other than end units, such as hidden layer units, such as stateful hidden layer units. As another example, in some example neural networks, gated network unit 200 can be employed for network units that are and/or include linear network units, such as linear layers. Additionally and/or alternatively, however, in some embodiments, the configuration depicted in FIG. 3 can be utilized for benefit paths corresponding to end units, such as input features or embeddings, biases, link weights, and/or stateless hidden layer units.

In response to input 301, network unit can be configured to provide network unit output 303. For instance, network unit output 303 can be the output from the network unit 302 without adjustment by gating units (e.g., benefit path 304, scaling function 306, clipping function 308). Network unit output 303 can be multiplied by gating value 309 or, in embodiments without clipping function 308, scaled benefit value 307 to produce gated output 310. Gated output 310 can be propagated further along the neural network (e.g., in place of network unit output 303).

The gated network unit 300 additionally includes benefit path 304. Benefit path 304 can include one or more benefit units configured to provide benefit score 305. Any suitable arrangement and/or number of benefit units can be employed in benefit path 304. For instance, benefit path 304 can include one or more benefit units that are learned by training a machine-learned model containing gated network unit 300. In the embodiment shown in FIG. 3, benefit path 304 can be a benefit matrix 304 defining a weighted sum of network unit outputs 313 from network units on the same layer 312 as network unit 302. For example, each of the one or more benefit units in the benefit matrix can include at least one benefit parameter defining a multiplier, each multiplier associated with one of the some or all network units in layer 312. In some embodiments, the benefit matrix 304 can be one-dimensional (e.g., a benefit vector) such that the benefit score 305 is defined as the sum of the component-wise vector product of the benefit matrix 304 and the network unit outputs 313.

In some embodiments, the benefit matrix 304 can be a two-dimensional matrix, such as a square matrix. For instance, the benefit matrix 304 can define a benefit vector for each of the network units in layer 312. In this way, the product of layer 312 and the benefit matrix 304 can produce a benefit layer corresponding to layer 312. The benefit score 305 for each network unit (e.g., 302) in layer 312 can thus be computed simultaneously, which, in some cases, can serve to expedite processing and/or conserve computing resources. Additionally, in some cases, the vector product can be performed efficiently on hardware that is typically utilized for neural network processing.

Informally, the benefit score 305 can be learned to represent the relative usefulness or benefit of network unit 302 to the neural network. For instance, the benefit score 305 can represent the effect that network unit 302 has on predictions from the neural network, such as the overall prediction and/or localized outputs (e.g., gated output 310) from the network unit 302 and/or other network units proximate network unit 302.

In the embodiment of gated network unit 300, benefit path 304 can include one or more benefit units configured to compute benefit score 305 for network unit 302. For instance, the benefit score 305 can be computed as a weighted sum of network unit outputs 313. In other words, the benefit path parameters for benefit path 304 can include weights for the weighted sum of network unit outputs 313.

The gated network unit 300 additionally includes scaling function 306. Scaling function 306 is configured to produce scaled benefit value 307 based on benefit score 305. Scaling function 306 can be any suitable function defined with one or more parameters (e.g., multiplicands, biases, divisors, limits, slopes, scaling, etc.). In some embodiments, the one or more parameters and/or the functional form of scaling function 306 can be learned during training of the neural network. For instance, in some embodiments, the functional form of the scaling function 306 can be selected from a set of possible functional forms. In some embodiments, the scaling function 306 can be a function with a finite range, such as a range of [0, 1], or a clipped range, such as [0, ∞].

In some embodiments, scaling function 306 can be a sigmoid function, such as sigmoid ($\rho*b+\xi$), where $\rho$ is a ramp-up coefficient which represents effects of correlation of one or more network units (e.g., including network unit 302) within a layer (e.g., layer 312) and is a mix-in margin which represents a contribution to importance from a prior, where b is benefit score 305. The sigmoid function described above essentially mixes the network unit with a zero unit, producing a value approaching zero if network unit 302 has low benefit relative to other network units.

The gated network unit 300 additionally can include clipping function 308. In some embodiments, clipping function 308 may be omitted, and scaled benefit value 307 may be multiplied directly with network unit output 303 (e.g., in place of gating value 309). Clipping function 308 is configured to clip scaled benefit value 307. For instance, gating value 309 can be clipped (e.g., to zero) if scaled benefit value 307 is below some threshold, such as a clipping threshold. If scaled benefit value 307 is above the clipping threshold, the gating value 309 may be close to and/or equivalent to scaled benefit value 307, or a multiple of scaled benefit value 307, or any other nonzero number.

In some embodiments, the clipping threshold can be zero. In some embodiments, the clipping threshold can be between zero and one, such as between zero and 0.1. In some embodiments, the clipping threshold can be selected based on an initial value for benefit score 305. For example, the clipping threshold can be selected such that the clipping threshold does not clip potentially beneficial network unit 302, especially in cases where the gating value 309 is used in backpropagation (e.g., as opposed to scaled benefit value 307). Additionally and/or alternatively, the clipping function 308 can be an activation function, such as a ReLU activation function. In some embodiments, the gating value 309 can be used during forward propagation and the scaled benefit value 307 can be used during backpropagation. This can prevent network unit 302 from being locked into a zero gating value 309 indefinitely. In some embodiments, the scaled benefit value 307 can be used for training the network (e.g., in both forward propagation and backpropagation steps), and gating value 309 can be used for forward propagation at inference time.

FIG. 4 depicts an example gated network unit 400 according to example aspects of the present disclosure. The gated network unit 400 includes a network unit 402. For instance, network unit 402 can be, but is not limited to, an input feature, input node, embedding unit, embedding vector (e.g., representing input features, such as a specific input feature and/or feature value), link (e.g., hidden layer links), weight (e.g., link weights), bias (e.g., hidden layer biases), neuron unit (e.g., hidden neurons), matrix multiplication parameter, or any other suitable component of a neural network. Arrows (e.g., input 401, gated output 410) can represent a scalar quantity and/or a vector quantity having any dimensionality. In example neural networks, gated network unit 400 can be employed for hidden layer units, such as stateless hidden layer units. Additionally and/or alternatively, however, in some embodiments, the configuration depicted in FIG. 4 can be utilized for benefit paths corresponding to end units, such as input features or embeddings, biases, link weights, and/or stateful hidden layer units.

Network unit 402 is included in layer 412. For instance, layer 412 can be a layer of a neural network. For the purposes of illustration, layer 412 is depicted as having only network unit 402. However, layer 412 can additionally include one or more network units other than network unit 402.

In response to input 401, network unit can be configured to provide network unit output 403. For instance, network unit output 403 can be the output from the network unit 402 without adjustment by gating units (e.g., benefit path 404, scaling function 406, clipping function 408). Network unit output 403 can be multiplied by gating value 409 or, in embodiments without clipping function 408, scaled benefit value 407 to produce gated output 410. Gated output 410 can be propagated further along the neural network (e.g., in place of network unit output 403).

The gated network unit 400 additionally includes benefit path 404. Benefit path 404 can include one or more benefit units configured to provide benefit score 405. Any suitable arrangement and/or number of benefit units can be employed in benefit path 404. For instance, benefit path 404 can include one or more benefit units that are learned by training a machine-learned model containing gated network unit 400. In the embodiment shown in FIG. 4, benefit path 404 can be a benefit matrix 404 defining a weighted sum of network unit outputs 413 from network units on the previous layer 414 as network unit 402. For example, each of the one or more benefit units in the benefit matrix can include at least one benefit parameter defining a multiplier, each multiplier associated with one of the some or all network units in previous layer 414. In some embodiments, the benefit matrix 404 can be one-dimensional (e.g., a benefit vector) such that the benefit score 405 is defined as the sum of the component-wise vector product of the benefit matrix 404 and the network unit outputs 413.

In some embodiments, the benefit matrix 404 can be a two-dimensional matrix, such as a square matrix. For instance, the benefit matrix 404 can define a benefit vector for each of the network units in previous layer 414. In this way, the product of layer 414 and the benefit matrix 404 can produce a benefit layer corresponding to layer 412. The benefit score 405 for each network unit (e.g., 402) in layer 412 can thus be computed simultaneously, which, in some cases, can serve to expedite processing and/or conserve computing resources. Additionally, in some cases, the vector product can be performed efficiently on hardware that is typically utilized for neural network processing.

Informally, the benefit score 405 can be learned to represent the relative usefulness or benefit of network unit 402 to the neural network. For instance, the benefit score 405 can represent the effect that network unit 402 has on predictions from the neural network, such as the overall prediction and/or localized outputs (e.g., gated output 410) from the network unit 402 and/or other network units proximate network unit 402.

In the embodiment of gated network unit 400, benefit path 404 can include one or more benefit units configured to compute benefit score 405 for network unit 402. For instance, the benefit score 405 can be computed as a weighted sum of network unit outputs 413. In other words, the value of the benefit score 405 may be the only benefit path parameter for benefit path 404.

The gated network unit 400 additionally includes scaling function 406. Scaling function 406 is configured to produce scaled benefit value 407 based on benefit score 405. Scaling function 406 can be any suitable function defined with one or more parameters (e.g., multiplicands, biases, divisors, limits, slopes, scaling, etc.). In some embodiments, the one or more parameters and/or the functional form of scaling function 406 can be learned during training of the neural network. For instance, in some embodiments, the functional form of the scaling function 406 can be selected from a set of possible functional forms. In some embodiments, the scaling function 406 can be a function with a finite range, such as a range of [0, 1], or a clipped range, such as [0, ∞].

In some embodiments, scaling function 406 can be a sigmoid function, such as sigmoid (ρ*b+ξ), where ρ is a ramp-up coefficient which represents effects of correlation of one or more network units within a layer (e.g., layer 412 and/or layer 414) and ξ is a mix-in margin which represents a contribution to importance from a prior, where b is benefit score 405. The sigmoid function described above essentially mixes the network unit with a zero unit, producing a value approaching zero if network unit 402 has low benefit relative to other network units.

The gated network unit 400 additionally can include clipping function 408. In some embodiments, clipping function 408 may be omitted, and scaled benefit value 407 may be multiplied directly with network unit output 403 (e.g., in place of gating value 409). Clipping function 408 is configured to clip scaled benefit value 407. For instance, gating value 409 can be clipped (e.g., to zero) if scaled benefit value 407 is below some threshold, such as a clipping threshold. If scaled benefit value 407 is above the clipping threshold, the gating value 409 may be close to and/or equivalent to scaled benefit value 407, or a multiple of scaled benefit value 407, or any other nonzero number.

In some embodiments, the clipping threshold can be zero. In some embodiments, the clipping threshold can be between zero and one, such as between zero and 0.1. In some embodiments, the clipping threshold can be selected based on an initial value for benefit score 405. For example, the clipping threshold can be selected such that the clipping threshold does not clip potentially beneficial network unit 402, especially in cases where the gating value 409 is used in backpropagation (e.g., as opposed to scaled benefit value 407). Additionally and/or alternatively, the clipping function 408 can be an activation function, such as a ReLU activation function. In some embodiments, the gating value 409 can be used during forward propagation and the scaled benefit value 407 can be used during backpropagation. This can prevent network unit 402 from being locked into a zero gating value 409 indefinitely. In some embodiments, the scaled benefit value 407 can be used for training the network (e.g., in both forward propagation and backpropagation steps), and gating value 409 can be used for forward propagation at inference time.

Example Neural Networks

Referring now to FIGS. 5 through 9, example configurations of neural networks are discussed according to example aspects of the present disclosure. The example configurations discussed in FIGS. 5 through 9 are provided for the purpose of illustration. One of ordinary skill in the art will understand that modifications and variations may be made to the embodiments illustrated in the figures without departing from the scope and spirit of the present disclosure.

Figure 5:
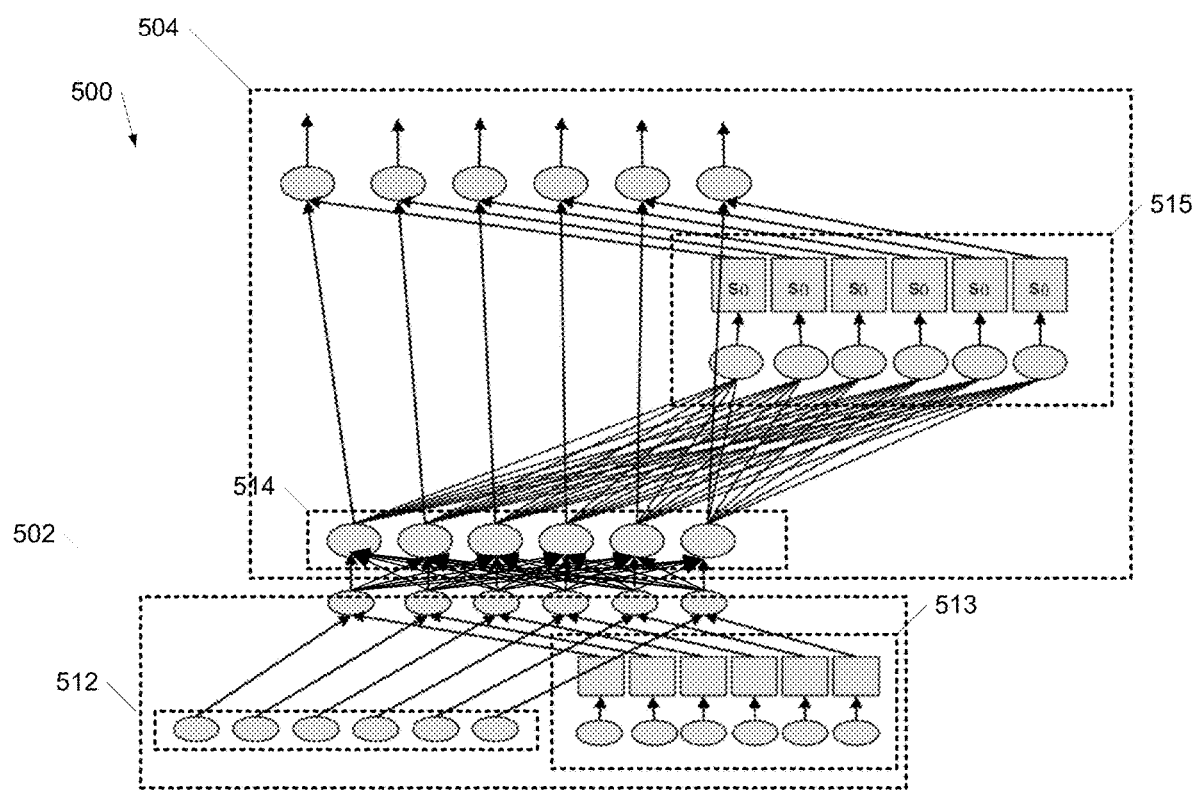
FIG. 5 depicts a block diagram of a portion of an example neural network according to example aspects of the present disclosure.

FIG. 5 depicts a portion of a neural network 500 according to example aspects of the present disclosure. The neural network 500 includes a first gated network unit layer 502 and a second gated network unit layer 504. The second gated network unit layer 504 can be subsequent to the first gated network unit layer 502. First gated network unit layer 502 includes end unit layer 512 and end unit gating layer 513. Second gated network unit layer 504 includes hidden unit layer 514 and hidden unit gating layer 515. FIG. 5 thus illustrates a configuration of a neural network wherein a first gating configuration is employed for a first type of network unit (e.g., end units) and a second gating configuration is employed for a second type of network unit (e.g., hidden units).

In the embodiment illustrated in FIG. 5, some or all of the network units in the first gated network unit layer 502 can behave like gated network unit 200 of FIG. 2. For instance, each node in first network unit layer 512 has a corresponding gating path in first network unit gating layer 513. For instance, for each end unit in first network unit layer 512, first network unit gating layer 513 can include one or more of benefit paths, scaling functions, and/or clipping functions as described with reference to FIG. 2. In particular, each network unit in first network unit layer 512 can have a coupled benefit unit in network unit gating layer 513 configured to store a benefit score associated with the network unit. For instance, in some embodiments, some or all of the network units in first network unit layer 512 can be end units. Additionally and/or alternatively, in the embodiment illustrated in FIG. 5, some or all of the network units in the first gated network unit layer 512 can be stateless hidden layer units.

In the embodiment illustrated in FIG. 5, each network unit in the second gated network unit layer 504 behaves like gated network unit 300 of FIG. 3. For instance, each node in hidden unit layer 514 has a corresponding gating path in hidden unit gating layer 515. For instance, for each hidden unit in hidden unit layer 514, hidden unit gating layer 515 can include one or more of benefit paths, scaling functions, and/or clipping functions as described with reference to FIG. 3. In particular, each hidden unit in hidden unit layer 514 has an associated benefit path in hidden unit gating layer 515 that determines a benefit score for the hidden unit based on the values of hidden units in hidden unit layer 514.

Figure 6:
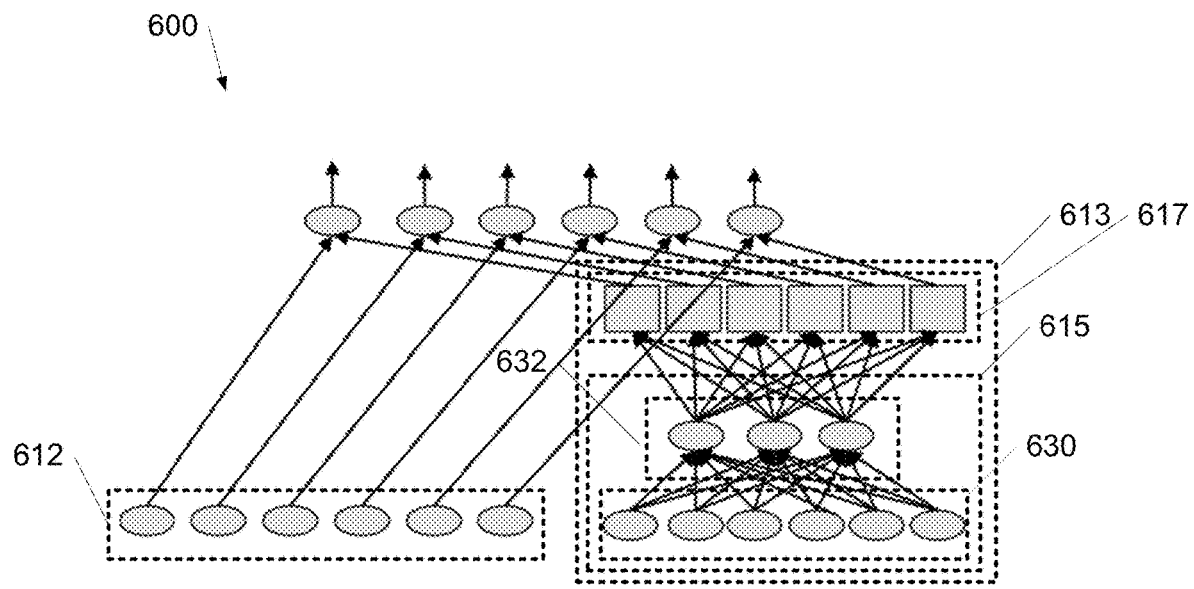
FIG. 6 depicts a block diagram of a portion of an example neural network according to example aspects of the present disclosure.

FIG. 6 illustrates a portion of an example neural network including gated network unit layer 600 with a deep gating path 613 according to example aspects of the present disclosure. Gated network unit layer 600 can be employed as part of a neural network, such as neural network 500 of FIG. 5. For example, gated network unit layer 600 can be employed additionally and/or alternatively to first gated network unit layer 502 of FIG. 5. Deep gating path 613 is configured to provide gating values for each network unit in network unit layer 612. Deep gating path 613 includes a deep benefit path 615. Deep benefit path 615 is illustrated with two benefit unit layers 630 and 632. It should be understood that any suitable number of layers and/or benefit units can be employed in deep benefit path 615 in accordance with the present disclosure.

In particular, deep benefit path 615 illustrates a bottleneck configuration. For instance, first benefit unit layer 630 has the same dimensionality as network unit layer 612, and bottleneck benefit unit layer 632 has a lower dimensionality than network unit layer 612. Deep gating path 613 returns to the same dimensionality as network unit layer 612 before being multiplied with network unit layer 612 at scaling and/or clipping layer 617. For instance, scaling and/or clipping layer 617 can include one or more scaling functions and/or clipping functions. It should be understood that deep benefit paths not employing a bottleneck layer (e.g., deep benefit paths wherein each layer has a dimensionality of equivalent to and/or greater than the dimensionality of a corresponding network unit layer) can also be employed in place of deep benefit path 615 without deviating from the scope of the present disclosure. Additionally and/or alternatively, benefit unit layer 630 and/or bottleneck benefit unit layer 632 can include one or more inputs from one or more network unit layers (e.g., network unit layer 612). For instance, in some embodiments, a weighted sum of network unit layer 612 in addition to and/or alternatively to benefit unit layer 630.

Figure 7:
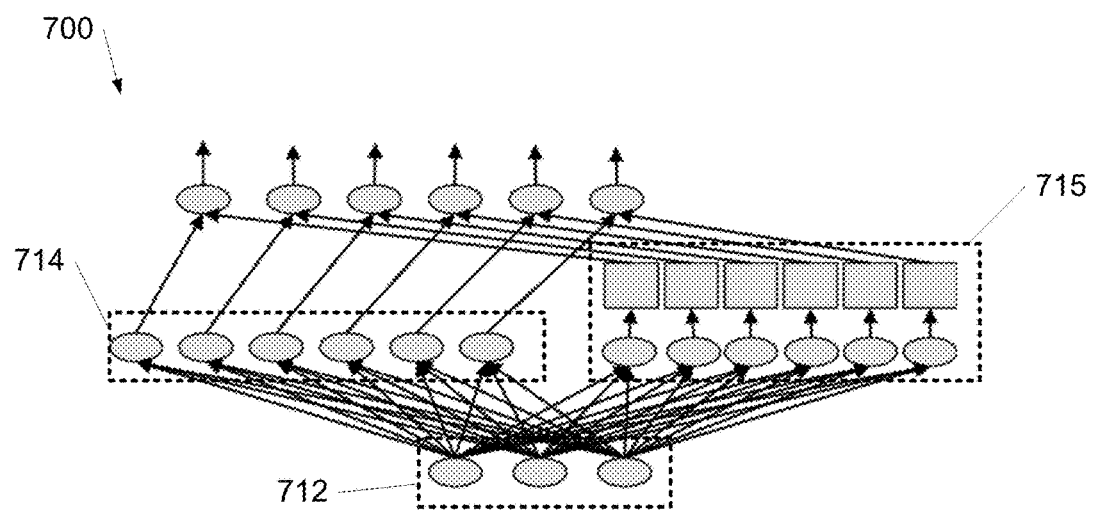
FIG. 7 depicts a block diagram of a portion of an example neural network according to example aspects of the present disclosure.

FIG. 7 illustrates a portion of an example neural network including gated network unit layer 700 according to example aspects of the present disclosure. Gated network unit layer 700 can be employed as part of a neural network, such as neural network 500 of FIG. 5. For example, gated network unit layer 700 can be employed additionally and/or alternatively to second gated network unit layer 504 of FIG. 5. In particular, each network unit in network unit layer 714 of gated network layer 700 behaves like gated network unit 400 of FIG. 4. For instance, each node in network unit layer 714 has a corresponding gating path in gating layer 715. For instance, for each network unit in network unit layer 714, gating layer 715 can include one or more of benefit paths, scaling functions, and/or clipping functions as described with reference to FIG. 4. In particular, each network unit in network unit layer 714 has an associated benefit path in network unit gating layer 715 that determines a benefit score for the network unit based on the values of network units in prior network unit layer 712.

Other example neural network configurations can be employed in accordance with the present disclosure beyond those depicted in the Figures. For instance, neural networks having any type and/or number of network units, network unit layers, nodes, links, biases, or other components can be employed in accordance with the present disclosure. Additionally, neural network having any type and/or number of benefit paths, benefit units, scaling functions, clipping functions, deep benefit paths, or other gating units can be employed in accordance with the present disclosure. Additionally, other forms of neural networks, such as but not limited to recursive neural networks and/or neural networks having one or more linear components or layers can be employed in accordance with the present disclosure.

Figure 8:
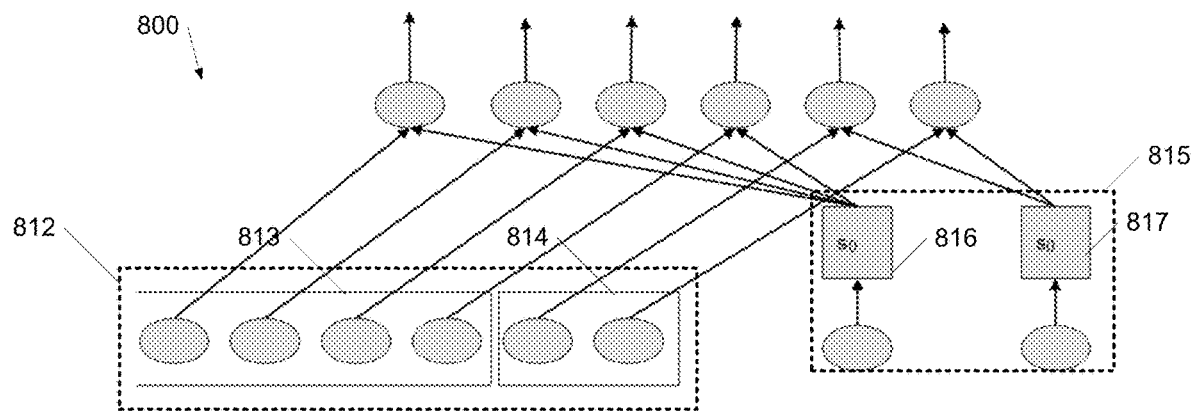
FIG. 8 depicts a block diagram of a portion of an example neural network according to example aspects of the present disclosure.

FIG. 8 illustrates a portion of an example neural network including a gated network unit layer 800 according to example aspects of the present disclosure. Gated network unit layer 800 can be employed as part of a neural network, such as neural network 500 of FIG. 5. For example, gated network unit layer 800 can be employed additionally and/or alternatively to first gated network unit layer 502 and/or second gated network unit layer 504 of FIG. 5.

Gated network unit layer 800 includes an embedding layer 812. Embedding layer 812 includes two input features, each represented by a plurality of embedding units. For instance, a first input feature is represented by the embedding units in first embedding vector 813. A second input feature is represented by the embedding units in second embedding vector 814. As illustrated in FIG. 8, a first gating path 816 is configured to provide a gating value to multiply first embedding vector 813. Additionally, a second gating path 817 is configured to provide a gating value to multiply second embedding vector 814. Gating layer 815 is illustrated with two gating paths 816 and 817. It should be understood that any suitable number of layers and/or benefit units can be employed in place of gating layer 815 in accordance with the present disclosure.

Figure 9:
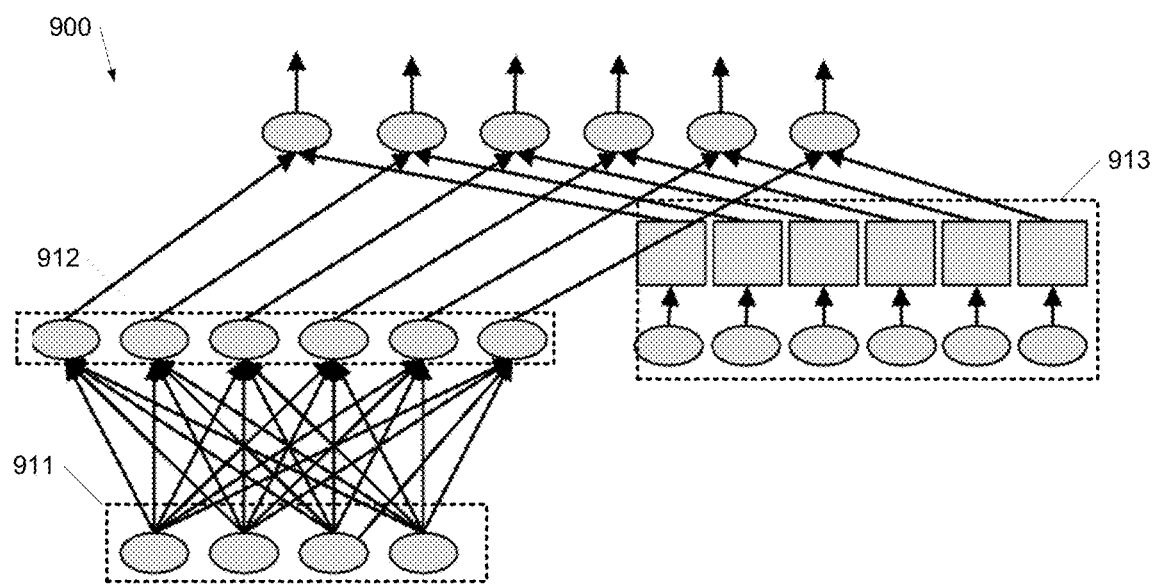
FIG. 9 depicts a block diagram of a portion of an example neural network according to example aspects of the present disclosure.

FIG. 9 illustrates a portion of an example neural network including a gated network unit layer 900 according to example aspects of the present disclosure. Gated network unit layer 900 includes a network unit layer 912. Gated network unit layer 900 also includes a prior network unit layer 911 that is prior to network unit layer 912. Gated network unit layer 900 further includes a gating layer 913 configured to provide one or more gating values for network unit layer 912. In some embodiments, each of the network units in network unit layer 912 can be stateful. Additionally, as illustrated in FIG. 9, the gating layer 913 can include standalone benefit paths for each of the network units in network unit layer 912. In other words, a gating path for each network unit in network unit layer 912 includes a standalone benefit path that is stateful.

In some embodiments, some components of gating layer 913 can be incorporated into the links in network unit layer 912. For example, if the activation of network unit layer 912 is linear, then the gating path can be factored into the link weights for the network unit layer. If, however, the activation is nonlinear, then some embodiments can deploy only the non-clipped and/or non-zero paths in gating layer 913. Clipped and/or zeroed paths can be used to eliminate corresponding multiplication operations and not deployed for an inference model.

Example Gated MDL on Direct Linear Layers

Deep models in many applications consist of a deep neural network component joint with linear model components. The linear layers, which can be referred to as direct layers, typically consist of single dimension scalars representing feature weights (e.g., instead of vectors). The linear layers can additionally and/or alternatively utilize binary feature values or float feature values. Example special linear layers can address biases in a deployed model and/or adds a winner's curse correction on top of the prediction. In some embodiments, example Gated MDL aspects as described herein can be extended to linear models and/or to direct layers in deep models, such as a winner's curse correction layer.

Aspects and advantages described herein for backpropagation for end units can be applied to feature weights of a linear model. Additionally, the approach as described herein for hidden activation can also be used for feature weights of a linear model. Example approaches that can be used can include the following:

Learned benefit score and resulting multiplier for each unit: This relatively straightforward approach can replace a linear algorithm by training gating parameters as described herein. For instance, this approach can apply the configurations and approach shown and described with reference to FIGS. 2 and 502 of FIG. 5.

Learned feature base weight with deep gating path: A learned feature weight can be learned as a linear model, but gating parameters can be trained through a deep gating path. For each feature, the input to the deep gating path can be stored in addition to its base weight, and additionally can include a learned network of links and biases used to compute the gating value. This approach is similar to that used for embeddings and described in FIG. 6.

Self gating through a deep gating path: In some implementations, features can have only a single base weight state. This weight is forward propagated through a deep network to generate gating values that are scaled to gate the weight. This approach is similar to the configuration and approach illustrated and discussed with reference to FIGS. 3 and 504 of FIG. 5.

The first method can be linear, while the other two can include deep networks. In some embodiments, it can be sufficient to apply a bottleneck layer in the gating path in the latter two approaches, even with a bottleneck having a width of one unit.

In the direct benefit score approach, in some implementations, only the regularized weight value can be deployed. This can also be true for the self-gating approach, which, in some cases, can include no other learned state for the feature, although additional states can be learned for the network links. In the second approach, both the feature weights and the benefit scores can be deployed, as the combination of features entering the deep network can be example dependent.

Example Methods

Figure 10:
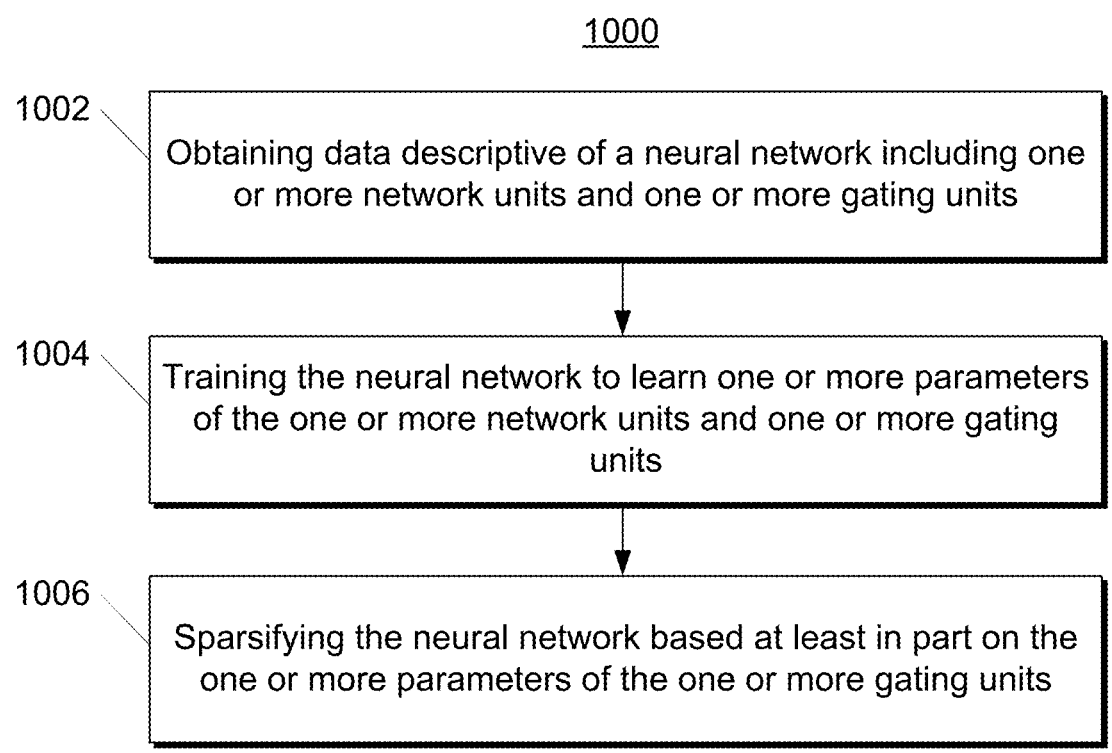
FIG. 10 depicts a flow diagram for deploying a neural network according to example aspects of the present disclosure.

FIG. 10 depicts a flow chart diagram of an example method 1000 for deploying a neural network according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain data descriptive of a neural network. The neural network can include one or more network units. For instance, network units can include, but are not limited to, input features, input nodes, embedding units, embedding vectors (e.g., representing input features, such as a specific input feature and/or feature value), links (e.g., hidden layer links), weights (e.g., link weights), biases (e.g., hidden layer biases), neuron units (e.g., hidden neurons), matrix multiplication parameters, activation values for neurons (e.g., hidden neurons), including activation values for a specific input (e.g., training example), or any other suitable component of a neural network.

In some cases, a network unit can include at least one end unit. An end unit can be a unit that represents the end of backpropagation along a path. In other words, an end unit is a unit from which a gradient is not backpropagated further during backpropagation training. For instance, end units can include, but may not be limited to, embeddings, input features, or bias nodes and/or links. In some cases, a network unit can include at least one hidden unit. A hidden unit can be a unit that is included in a hidden layer.

The neural network can additionally and/or alternatively include one or more gating units. The one or more gating units can be configured to produce one or more gating values for the one or more network units. For instance, the one or more gating units can include one or more scaling functions associated with some or all of the one or more network units. As another example, the one or more gating units can include at least one benefit path including one or more benefit units. As another example, the one or more gating units can include one or more clipping functions.

At 1004, the computing system can train the neural network. For instance, the computing system can learn one or more network parameters of the one or more network units. Additionally and/or alternatively, the computing system can learn one or more gating parameters of the one or more gating units. One example method for training the neural network is described with respect to training method 1100 of FIG. 11.

At 1006, the computing system can sparsify the neural network. For instance, the computing system can sparsify the neural network based at least in part on the one or more gating parameters. For instance, in some embodiments, a gating path can be simplified after gating parameters for one or more gating units in the gating path have been learned through training. For example, any multiplication and function evaluation (e.g., scaling and/or clipping function evaluation) can be performed based on any known values of benefit score (e.g., from a bias unit) and replaced by a bias unit to be multiplied with a network unit output. In some cases, such as in the case where a network unit includes a linear link having a link weight, the link weight can be scaled by the known gating value or clipped gating value before deployment.

Additionally and/or alternatively, some network units which are clipped to zero, such as sparse embeddings, can be removed entirely from the sparsified network. In other words, network units with gating values less than the clipping threshold can be removed from the deployed model. For instance, if an embedding vector and/or component is clipped to zero, it can be removed from an embedding table. If a hidden network unit, such as a stateless hidden network unit, is clipped to zero, it can be discarded from a multiplication matrix (e.g., a row representing the hidden network unit can be removed from the multiplication matrix). As another example, some percentage of network units with the lowest benefit score can be removed in the sparsified model.

In this way, a sparsified neural network may comprise a smaller plurality of network units than a pre-training and/or trained neural network. That is, the neural network that is trained may comprise a first number of network units and the sparsified neural network may comprise a second number of network units that is smaller than the first number of network units. For example, the sparsified neural network may comprise network units corresponding to only gated network units having a scaling value that exceeds the clipping threshold such that some network units of the input neural network are discarded. The output neural network may therefore be a more compact neural network that requires less memory to store and/or fewer operations to process data.

Figure 11:
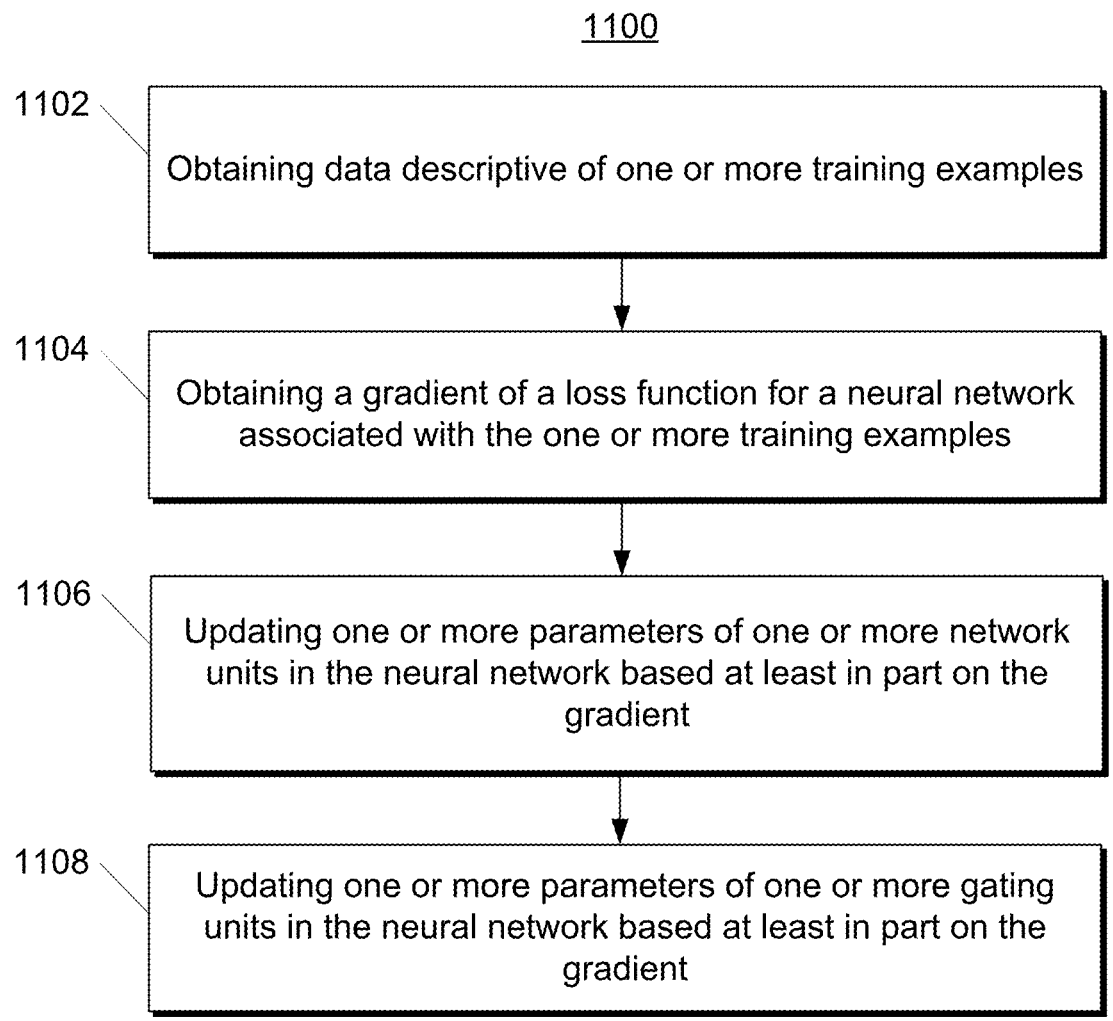
FIG. 11 depicts a flow diagram for training a neural network according to example aspects of the present disclosure.

FIG. 11 depicts a flow chart diagram of an example method 1100 for training a neural network according to example embodiments of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

At 1102, a computing system can obtain data descriptive of one or more training examples. The one or more training examples can include online training examples. For instance, during online training, the neural network is trained over time and the benefit accrued by a feature per training example encapsulates improvement to an objective with the feature and a cost of learning the feature using a learning algorithm.

Additionally and/or alternatively, the one or more training examples can include one or more epochs. For instance, in some embodiments, the steps 1104-908 described below can be performed iteratively for each training example in the one or more training examples.

At 1104, the computing system can obtain a gradient of a loss function for a neural network associated with the one or more training examples. The neural network can include, for instance, one or more network units and/or one or more gating units associated with some or all of the one or more network units. The one or more network units can include one or more network parameters. The one or more gating units can include one or more gating parameters.

The loss function can be any suitable function. The gradient of the loss function can be obtained by any suitable method. For instance, the gradient of the loss function can be obtained in accordance with gradient descent techniques, such as stochastic gradient descent (e.g., per coordinate SGD, such as AdaGrad). In particular, the gradient of the loss can describe a delta for one or more parameters, such as one or more network parameters and/or one or more gating parameters, that will reduce the loss.

At 1106, the computing system can update one or more network parameters based at least in part on the gradient. For instance, the one or more network parameters can be adjusted in the direction of a delta described by the gradient. A learning rate can describe the magnitude of adjustment made in the direction of the delta, wherein a larger learning rate means a larger adjustment for the parameters with each update. In some embodiments, such as embodiments utilizing AdaGrad, the learning rate can additionally and/or alternatively be a function of one or more accumulated statistics.

At 1108, the computing system can update one or more gating parameters based at least in part on the gradient. For instance, the one or more gating parameters can be adjusted in the direction of a delta described by the gradient. In some embodiments, the one or more gating parameters can be learned using the same learning algorithm as the one or more network parameters.

In some embodiments, a learning rate can be tuned for the one or more gating parameters. For example, in cases where a gating unit is responsible for more than one network unit, it may be desirable to have a lower learning rate for the gating parameters associated with the gating unit, as the gating unit may receive more gradient updates per training example than a single network unit. In cases where each training example is visited over a plurality of epochs, the gain per feature can be linear with the number of relevant training examples, but the cost per feature may be sublinear. In this cases, it can be desirable to scale the benefit over iterations of the same training example to avoid overvaluing the benefit contribution. For example, in some embodiments, a gating parameter can be updated only for the first iteration of a training example. As another example, the amount that a gating parameter is changed can be scaled (e.g., scaled down) in subsequent visits to the same training example. For instance, the amount can be scaled to the same level for all subsequent visits and/or scaled as a function of the number of times the same training example is visited. As another example, a gating parameter can be reset between visits and updated for each epoch that visits all training examples. In some embodiments, a gating parameter from a prior epoch can be used to scale the feature during a current epoch.

As another example, the one or more gating parameters can be learned by a convex combination score that scales down an initial (e.g., during the first epoch) gating parameter and scales up a gating parameter from newer epochs. For instance, the gating parameter can be learned by subtracting sublinear terms representing a lower bound (e.g., 0.5 log n) on the learning cost for the parameter. At late epochs, the gating parameter will then be the improvement on the loss with a negative additional term of 0.5 log n. In this example, n is the number of training examples seen with a feature.

In some embodiments, the one or more gating parameters can be learned for and/or associated with a particular activation value. For instance, an activation value can represent a localized and/or overall state of the neural network, such as a particular input feature value, embedding value, cross of features, intermediate value, such as an intermediate value at a set of network units of the neural network, activation status at a set of neurons, or any other suitable state of the neural network. For instance, in one embodiment, a neuron (e.g., a hidden layer neuron) can act as a first combination of features for a first input feature and/or embedding, and as a second combination of features for a second input feature and/or embedding. A gating parameter can be determined for a specific cross of features represented by the unique activation value for which the cross is triggered. A learned path can invoke the gating parameter for the cross of features. Additionally and/or alternatively, the one or more gating parameters can be aggregated at a network unit across all activation values.

In some embodiments, a gating parameter can be initialized to a mix-in margin (i.e., the parameter $\xi$ of a sigmoid activation function). For example, embodiments wherein a benefit includes a single coupled benefit unit may initialize the value of the benefit unit to the mix-in margin. As another example, embodiments wherein a benefit path includes a weighted sum of values can include one or more biases that can be initialized to the mix-in margin. In some embodiments, a gating parameter can be initialized to zero. In some embodiments, for example wherein a benefit path includes a single coupled benefit unit, this can result in the benefit score remaining at zero until a training process includes an example that suggests the benefit of a network unit.

Figure 12:
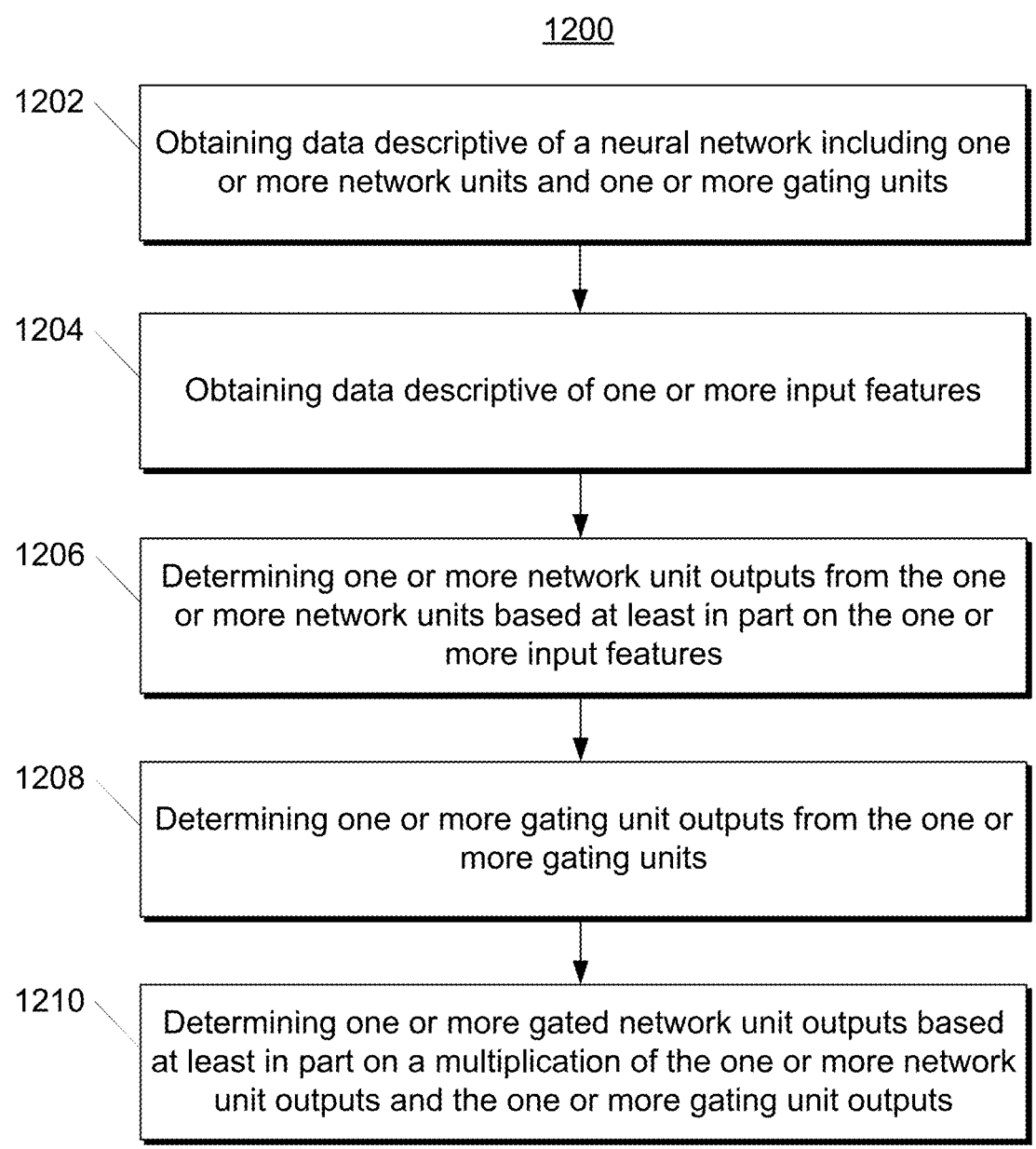
FIG. 12 depicts a flow diagram for performing inference utilizing a neural network according to example aspects of the present disclosure.

FIG. 12 depicts a flow chart diagram of an example method 1200 for performing inference using a neural network according to example embodiments of the present disclosure. Although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

At 1202, a computing system can obtain data descriptive of a neural network including one or more network units and one or more gating units. The neural network can include one or more network units. For instance, network units can include, but are not limited to, input features, input nodes, embedding units, embedding vectors (e.g., representing input features, such as a specific input feature and/or feature value), links (e.g., hidden layer links), weights (e.g., link weights), biases (e.g., hidden layer biases), neuron units (e.g., hidden neurons), matrix multiplication parameters, or any other suitable component of a neural network.

In some cases, a network unit can include at least one end unit. An end unit can be a unit that represents the end of backpropagation along a path. In other words, an end unit is a unit from which a gradient is not backpropagated further during backpropagation training. For instance, end units can include, but may not be limited to, embeddings, input features, or bias nodes and/or links. In some cases, a network unit can include at least one hidden unit. A hidden unit can be a unit that is included in a hidden layer.

The neural network can additionally and/or alternatively include one or more gating units. The one or more gating units can be configured to produce one or more gating values for the one or more network units. For instance, the one or more gating units can include one or more scaling functions associated with some or all of the one or more network units. As another example, the one or more gating units can include at least one benefit path including one or more benefit units. As another example, the one or more gating units can include one or more clipping functions.

At 1204, a computing system can obtain data descriptive of one or more input features. Any suitable type and/or number of input features can be employed in accordance with the present disclosure. For example, the one or more input features can include feature data, such as numerical data, enumerated data, or other suitable feature data. As another example, the one or more input features can be represented as an embedding vector.

At 1206, a computing system can determine one or more network unit outputs from the one or more network units based at least in part on the one or more input features. For instance, the one or more network units can be configured to receive an input feature and/or an output from another network unit and produce an output based thereon. As another example, the one or more network units can output a constant value, such as a bias.

At 1208, a computing system can determine one or more gating unit outputs from the one or more gating units. For instance, the one or more gating unit outputs can include a benefit score provided by a benefit path. As another example, the one or more gating unit outputs can include a gating value provided by a scaling function. The gating value can be based at least in part on the benefit score. As another example, the one or more gating unit outputs can include a clipped gating value provided by a clipping function. For example, the clipped gating value can be zero if the gating value is below a clipping threshold and equivalent or otherwise mirror the form of the gating value if the gating value is above a clipping threshold.

At 1210, a computing system can determine one or more gated network unit outputs based at least in part on a multiplication of the one or more network unit outputs and the one or more gating unit outputs. For instance, the computing system can multiply a gating unit output from a gating path associated with a network unit with a network unit output from the associated network unit to produce a gated network unit output for the associated network unit. In some embodiments, the gated network unit output can be propagated through the neural network (e.g., in place of the network unit output).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing gating-based regularization of a neural network, the computing system comprising:
   one or more processors; and
   one or more non-transitory computer-readable media that collectively store:
      a neural network, the neural network comprising:
         a gated network unit, the gated network unit comprising one or more network parameters; and
         a gating path associated with the gated network unit, wherein the gating path comprises one or more gating units, wherein each of the one or more gating units comprises one or more gating parameters, wherein the gating path is configured to produce a gating value that represents an overall magnitude of an effect that the gated network unit has on predictions of the neural network without an adjustment by the gating unit;
      wherein a gated output of the gated network unit comprises an intermediate output of the gated network unit multiplied by the gating value; and
      instructions that, when executed by the one or more processors, cause the computing system to perform operations to train the neural network based on one or more training examples, wherein the operations comprise, for each of the one or more training examples:

determining a gradient of a loss function with respect to at least one of the one or more network parameters and one or more gating parameters; and updating a respective value of at least one of the one or more network parameters and the one or more gating parameters based on the gradient of the loss function.

2. The computing system of claim 1, wherein the one or more gating units comprises at least one of a benefit path configured to produce a benefit score associated with the gated network unit, a scaling function configured to produce the gating value based at least in part on the benefit score, or a clipping function configured to clip the gating value based at least in part on a clipping threshold.

3. The computing system of claim 2, wherein the benefit path comprises at least one of a benefit bias unit or a benefit link weight, wherein the one or more gating parameters comprises a benefit score bias, wherein the benefit bias unit is configured to store the benefit score bias, and wherein the benefit path produces the benefit score based at least in part on the benefit score bias, wherein the benefit path comprises at least one of a stateful benefit bias unit or a stateful benefit link weight.

4. The computing system of claim 2, wherein the neural network comprises one or more network layers, each of the one or more network layers comprising one or more network units, wherein a first network layer of the one or more network layers comprises the gated network unit, and wherein the benefit path comprises a weighted sum of inputs, wherein the weighted sum of inputs comprises outputs of the one or more network units.

5. The computing system of claim 2, wherein the benefit path comprises one or more benefit path layers, each of the benefit path layers comprising one or more benefit units.

6. The computing system of claim 5, wherein at least one of the one or more benefit path layers comprises a bottleneck layer, wherein a dimensionality of the bottleneck layer is less than a dimensionality of a preceding layer of the one or more benefit path layers.

7. The computing system of claim 1, wherein the neural network comprises a second gated network unit, wherein a second gated output of the second gated network unit comprises a second intermediate output of the second gated network unit multiplied by the gating value.

8. The computing system of claim 1, wherein at least one of the one or more gated network units and one or more gating units are stateful gating units that are respective to a state of the at least one gated network unit, wherein the at least one gated network unit having the state comprises at least one of an embedding unit, a link weight, or a bias unit.

9. The computing system of claim 1, wherein the one or more network units comprises an embedding vector, and wherein the gating value is associated with each embedding component in the embedding vector.

10. The computing system of claim 2, wherein the scaling function comprises one of a sigmoid function, a half-sigmoid function, or shifted piecewise smooth activation function.

11. The computing system of claim 2, wherein the scaling function comprises a self-gating scaling function.

12. The computing system of claim 1, wherein the one or more gating parameters are learned during training of the neural network.

13. The computing system of claim 1, wherein the one or more gating units are employed as an activation function for the gated network unit.

14. A computer-implemented method for performing inference using a machine-learned model, the computer-implemented method comprising:

obtaining, by a computing system comprising one or more computing devices, data descriptive of a neural network comprising:
- one or more network units; and
- one or more gating paths, each of the one or more gating paths associated with each of the one or more network units, wherein each of the one or more gating paths comprises one or more gating units;

obtaining, by the computing system, data descriptive of one or more input features;

determining, by the computing system, one or more network unit outputs from the one or more network units based at least in part on the one or more input features;

determining, by the computing system, one or more gating values from the one or more gating paths, wherein the one or more gating values represents an overall magnitude of an effect that the one or more network units has on predictions of the neural network without an adjustment by the one or more gating units; and determining one or more gated network unit outputs based at least in part on a combination of the one or more network unit outputs and the one or more gating values.

15. The computer-implemented method of claim 14, wherein the one or more gating units comprises at least one of a benefit path configured to produce a benefit score associated with the gated network unit, a scaling function configured to produce the gating value based at least in part on the benefit score, or a clipping function configured to clip the gating value based at least in part on a clipping threshold.

16. The computer-implemented method of claim 15, wherein the benefit path comprises at least one of a benefit bias unit or a benefit link weight, wherein the one or more gating parameters comprises a benefit score bias, wherein the benefit bias unit is configured to store the benefit score bias, and wherein the benefit path produces the benefit score based at least in part on the benefit score bias, wherein the benefit path comprises at least one of a stateful benefit bias unit or a stateful benefit link weight.

17. The computer-implemented method of claim 15, wherein the neural network comprises one or more network layers, each of the one or more network layers comprising one or more network units, wherein a first network layer of the one or more network layers comprises the gated network unit, and wherein the benefit path comprises a weighted sum of inputs, wherein the weighted sum of inputs comprises outputs of the one or more network units.

* * * * *